(12) United States Patent
De Lorenzo

(10) Patent No.: US 10,117,061 B2
(45) Date of Patent: Oct. 30, 2018

(54) SYSTEMS AND METHODS TO TRACK MOVEMENT OF A DEVICE IN AN INDOOR ENVIRONMENT

(71) Applicant: Athentek Innovations, Inc., Palo Alto, CA (US)

(72) Inventor: David S. De Lorenzo, Palo Alto, CA (US)

(73) Assignee: Athentek Innovations, Inc., Palo Alto, CA (US)

( * ) Notice: Subject to any disclaimer, the term of this patent is extended or adjusted under 35 U.S.C. 154(b) by 0 days.

(21) Appl. No.: 15/935,995

(22) Filed: Mar. 26, 2018

(65) Prior Publication Data

US 2018/0220268 A1 Aug. 2, 2018

Related U.S. Application Data

(63) Continuation of application No. 15/256,371, filed on Sep. 2, 2016, now abandoned.

(51) Int. Cl.
*H04W 4/02* (2018.01)
*H04W 4/33* (2018.01)
*H04B 17/318* (2015.01)

(52) U.S. Cl.
CPC .......... *H04W 4/027* (2013.01); *H04B 17/318* (2015.01); *H04W 4/33* (2018.02)

(58) Field of Classification Search
CPC ..... H04W 4/027; H04W 4/043; H04B 17/318
See application file for complete search history.

(56) References Cited

U.S. PATENT DOCUMENTS 8,463,291 B2   6/2013 Mirowski et al.
2004/0203904 A1* 10/2004 Gwon ................. G01S 5/0252
                                                           455/456.1
(Continued)

FOREIGN PATENT DOCUMENTS

EP   2928243        10/2015
EP   2928243 A1 * 10/2015 ............ H04W 64/00

OTHER PUBLICATIONS

Bahl, P. et al. "RADAR: An In-Building RF-based User Location and Tracking System," *IEEE Infocom*, pp. 775-784, Mar. 2000.
(Continued)

*Primary Examiner* — Mehmood B. Khan
(74) *Attorney, Agent, or Firm* — Levine Bagade Han LLP

(57) ABSTRACT

Systems and methods to track a device in an indoor environment having polygonal obstructions are disclosed. In one variation, a computer-implemented method to localize the device involves receiving, at a server, a signal strength profile from the device, wherein the signal strength profile includes signal strengths of wireless signal transceivers in the indoor environment; determining a raw estimated location in a coordinate plane representing the indoor environment by using a K-nearest neighbor algorithm; calculating a straight-line path in the coordinate plane from an immediately preceding location to the raw estimated location; selecting the raw estimated location as a candidate location when the straight-line path connects the two locations without intersecting any of the polygonal obstructions; calculating a weighted-average location using the immediately preceding location and the candidate location; and storing the weighted-average location as a new location when a hypothetical velocity is less than or equal to a saturation velocity.

20 Claims, 15 Drawing Sheets

(56) References Cited

U.S. PATENT DOCUMENTS

| | | | | |
|---|---|---|---|---|
| 2004/0263388 | A1* | 12/2004 | Krumm | G01C 21/206 342/451 |
| 2007/0219711 | A1* | 9/2007 | Kaldewey | G01C 21/00 701/434 |
| 2009/0043504 | A1* | 2/2009 | Bandyopadhyay | G01C 17/38 701/469 |
| 2010/0127935 | A1* | 5/2010 | Huang | G01S 1/68 342/463 |
| 2010/0208063 | A1* | 8/2010 | Lee | G06K 9/00771 348/143 |
| 2011/0164569 | A1* | 7/2011 | Bamberger | G01S 5/0252 370/328 |
| 2011/0250904 | A1* | 10/2011 | Valletta | G01S 5/0252 455/456.1 |
| 2012/0020533 | A1* | 1/2012 | Liu | G06K 9/00476 382/113 |
| 2012/0149415 | A1* | 6/2012 | Valaee | H04W 64/00 455/507 |
| 2013/0141233 | A1* | 6/2013 | Jacobs | G08B 19/00 340/521 |
| 2013/0162481 | A1* | 6/2013 | Parvizi | G01S 3/023 342/452 |
| 2013/0273938 | A1* | 10/2013 | Ng | H04W 64/00 455/456.1 |
| 2014/0011518 | A1* | 1/2014 | Valaee | H04W 64/00 455/456.1 |
| 2014/0163928 | A1* | 6/2014 | Kalai | G06F 17/5004 703/1 |
| 2015/0173037 | A1* | 6/2015 | Pijl | A61B 5/1117 455/456.1 |
| 2015/0189478 | A1* | 7/2015 | Ji | H04W 4/027 455/456.1 |
| 2015/0213391 | A1* | 7/2015 | Hasan | G06Q 10/06398 705/7.42 |
| 2015/0346333 | A1* | 12/2015 | Soto | G01S 13/08 702/143 |
| 2015/0350844 | A1* | 12/2015 | Agarwal | H04W 4/029 455/456.2 |
| 2016/0238690 | A1* | 8/2016 | Colucci | G01S 1/68 |
| 2017/0013409 | A1* | 1/2017 | Cerchio | G01C 25/005 |
| 2018/0070212 | A1 | 3/2018 | De Lorenzo | |

OTHER PUBLICATIONS

Jiang, P. et al. "Indoor Mobile Localization Based on Wi-Fi Fingerprint's Important Access Point," *International Journal of Distributed Sensor Networks*, vol. 2015, 8 pages, Mar. 2015.

Li, B. et al. "Method for yielding a database of location fingerprints in WLAN," *IEEE Proc.-Commun.*, 152:5, pp. 580-586, Oct. 2005.

Liu, J., "Survey of Wireless Based Indoor Localization Technologies," http://www.cse.wustl.edu/~jain/cse574-14/ftp/indoor.pdf, 17 pages, May 5, 2014, accessed on Aug. 9, 2016.

Shin, B. et al., "Enhanced Weighted K-Nearest Neighbor Algorithm for Indoor Wi-Fi Positioning Systems,", 2012 8th International Conference on Computing Technology and Information Management (ICCM) Apr. 2012, *IEEE*, pp. 574-577.

Tsai, W. et al., "The Development of an Indoor Location Based Service Test Bed," 22nd International Meeting of the Satellite Division of the Institute of Navigation, Savannah, GA, Sep. 22-25, 2009, pp. 1025-1033.

Yasin, M. et al., "A Survey of Positioning Techniques and Location Based Services in Wireless Networks," *IEEE*, Feb. 2015, 5 pages.

\* cited by examiner

SYSTEMS AND METHODS TO TRACK MOVEMENT OF A DEVICE IN AN INDOOR ENVIRONMENT

CROSS-REFERENCE TO RELATED APPLICATIONS

This is a continuation of U.S. patent application Ser. No. 15/256,371, filed on Sep. 2, 2016, which is incorporated herein by reference in its entirety.

BACKGROUND

1. Field of the Technology

The present disclosure relates generally to the field of indoor localization, and, more specifically, to systems and methods to track a device in an indoor environment having polygonal obstructions.

2. Related Art

Portable wireless devices such as smartphones, tablets, smartwatches, and fitness monitors are often carried by users throughout the day given the crucial functionalities provided by such devices. With the indispensable nature of these devices, the ability to ascertain their location is quickly becoming a prerequisite to understanding the behavior of their users. Although location tracking has traditionally been the domain of the Global Positioning System (GPS), satellite based tracking services cannot be used effectively in indoor environments. To overcome these limitations, systems have been developed utilizing wireless short-range networks such as WiFi and Bluetooth®.

WiFi based indoor localization techniques include localization based on signal propagation and localization based on position fingerprints. While the latter technique has received attention based on its ability to localize in complex indoor environments, the technique has not fared as well in environments containing obstructions such as retail or warehouse environments having product shelves or displays.

For example, FIG. 1 depicts a plan view of an estimated route 104 undertaken by a portable wireless device as determined using received signal strength indicator (RSSI) fingerprints in an indoor environment 100, such as a retail store. As can be seen in FIG. 1, the indoor environment 100 can contain polygonal obstructions 102 in the form of product shelves or displays. Also, the estimated route 104 shown in FIG. 1 is choppy and does not provide an accurate representation of the device user's movements in relation to the product aisles or shelves. In some circumstances, a filter can be applied to the raw estimated positions obtained from the RSSI fingerprints based on preset limitations such as a user's maximum velocity. However, as can be seen in FIG. 2, even when such a filter is applied, the estimated route 104 does not provide an accurate representation of the device user's movements vis-à-vis the polygonal obstructions 102 in the indoor environment 100.

Therefore, a solution is needed for a system and methods to conveniently and effectively track the movement of a device in an indoor environment having polygonal obstructions. Such a solution should be robust, relatively low-cost, and provide an accurate representation of the device user's movements relative to polygonal obstructions such as product aisles, displays, and indoor fixtures. Moreover, such a solution should not be overly complex and should be easy to deploy.

SUMMARY

A system to localize a device in an indoor environment is disclosed. The system includes wireless signal transceivers positioned in the indoor environment. The indoor environment can contain one or more polygonal obstructions. The system can also include a server comprising a processing unit, a memory unit, and a server communication unit. The processing unit can be programmed to receive a signal strength profile from the device. The signal strength profile can include signal strengths of the wireless signal transceivers received at the device in the indoor environment. The processing unit can also be programmed to determine a raw estimated location of the device in a coordinate plane representing the indoor environment by using a K-nearest neighbor (KNN) algorithm to compare the signal strength profile with reference profiles stored in a database.

The processing unit can be programmed to also calculate a straight-line path in the coordinate plane from an immediately preceding location of the device to the raw estimated location and select the raw estimated location as a candidate location when the straight-line path connects the two locations without intersecting any of the polygonal obstructions in the coordinate plane. The processing unit can be programmed to also calculate a weighted-average location using the immediately preceding location and the candidate location and store the weighted-average location as a new location of the device in the indoor environment when a hypothetical velocity calculated using an elapsed time and a distance separating the immediately preceding location and the weighted-average location is less than or equal to a saturation velocity.

The processing unit can be programmed to generate an interlinking point using an x-axis coordinate of the immediately preceding location and a y-axis coordinate of the raw estimated location or the y-axis coordinate of the immediately preceding location and the x-axis coordinate of the raw estimated location and select the interlinking point as the candidate location when a first linear segment connects the immediately preceding location and the interlinking point without intersecting any of the polygonal obstructions and a second linear segment connects the raw estimated location and the interlinking point without intersecting any of the polygonal obstructions.

The processing unit can be programmed to determine a first polyline path from the immediately preceding location to the raw estimated location where a portion of the first polyline path traverses a first artery lane in the indoor environment. The processing unit can also be programmed to determine a second polyline path from the immediately preceding location to the raw estimated location where a portion of the second polyline path traverses a second artery lane in the indoor environment. The processing unit can further be programmed to select the first artery lane as a preferred artery lane when the first polyline path is shorter than the second polyline path or select the second artery lane as the preferred artery lane when the second polyline path is shorter than the first polyline path.

The processing unit can be programmed to generate an artery entrance location using an x-axis coordinate of the immediately preceding location and a y-axis coordinate of the preferred artery lane or using the y-axis coordinate of the immediately preceding location and the x-axis coordinate of the preferred artery lane and select the artery entrance location as the candidate location.

The processing unit can be programmed to calculate a straight-line segment from the immediately preceding location to the artery entrance location prior to selecting the artery entrance location as the candidate location and determine a laterally displaced location when the straight-line segment intersects any of the polygonal obstructions. The laterally displaced location can be determined using a y-axis coordinate of the immediately preceding location and an x-axis coordinate of the raw estimated location. The processing unit can be programmed to select the laterally displaced location as the candidate location.

The processing unit can be programmed to compare the raw estimated location of the device in the coordinate plane with coordinates representing borders of the polygonal obstructions prior to calculating the straight-line path and determine the raw estimated location is within the borders of one of the polygonal obstructions. The processing unit can also be programmed to adjust at least one coordinate of the raw estimated location to place the raw estimated location outside of the borders of the polygonal obstruction.

The processing unit can also be programmed to set a saturated location as the new location of the device when the hypothetical velocity calculated using the elapsed time and the distance separating the immediately preceding location and the weighted-average location is greater than the saturation velocity. The saturated location can be generated using the saturation velocity and the saturated location can be closer in distance to the immediately preceding location than the weighted-average location.

The indoor environment can comprise between one wireless signal transceiver per 150 square meters and one wireless signal transceiver per 57 square meters. The wireless signal transceivers can include at least one of WiFi access points and Bluetooth® beacons.

A computer-implemented method to localize a device in an indoor environment is also disclosed. The method can involve receiving, at a server, a signal strength profile from the device. The signal strength profile can include signal strengths of wireless signal transceivers in the indoor environment and the indoor environment can contain one or more polygonal obstructions. The method can also involve determining, using a processing unit of the server, a raw estimated location of the device in a coordinate plane representing the indoor environment by using a K-nearest neighbor (KNN) algorithm to compare the signal strength profile with reference profiles stored in a database. The method can also involve calculating, using the processing unit of the server, a straight-line path in the coordinate plane from an immediately preceding location of the device to the raw estimated location and selecting, using the processing unit of the server, the raw estimated location as a candidate location when the straight-line path connects the two locations without intersecting any of the polygonal obstructions in the coordinate plane.

The method can also involve calculating, using the processing unit of the server, a weighted-average location using the immediately preceding location and the candidate location and storing, using the processing unit of the server, the weighted-average location as a new location of the device in the indoor environment when a hypothetical velocity calculated using an elapsed time and a distance separating the immediately preceding location and the weighted-average location is less than or equal to a saturation velocity.

The method can further include generating, using the processing unit of the server, an interlinking point using an x-axis coordinate of the immediately preceding location and a y-axis coordinate of the raw estimated location or the y-axis coordinate of the immediately preceding location and the x-axis coordinate of the raw estimated location. The method can also include selecting, using the processing unit of the server, the interlinking point as the candidate location when a first linear segment connects the immediately preceding location and the interlinking point without intersecting any of the polygonal obstructions and a second linear segment connects the raw estimated location and the interlinking point without intersecting any of the polygonal obstructions.

The method can also involve determining, using the processing unit of the server, a first polyline path from the immediately preceding location to the raw estimated location, wherein a portion of the first polyline path traverses a first artery lane in the indoor environment and determining, using the processing unit of the server, a second polyline path from the immediately preceding location to the raw estimated location, wherein a portion of the second polyline path traverses a second artery lane in the indoor environment. The method can further involve selecting, using the processing unit of the server, the first artery lane as a preferred artery lane when the first polyline path is shorter than the second polyline path and selecting, using the processing unit of the server, the second artery lane as the preferred artery lane when the second polyline path is shorter than the first polyline path and generating, using the processing unit of the server, an artery entrance location using an x-axis coordinate of the immediately preceding location and a y-axis coordinate of the preferred artery lane or using the y-axis coordinate of the immediately preceding location and the x-axis coordinate of the preferred artery lane and selecting, using the processing unit of the server, the artery entrance location as the candidate location.

The method can also involve calculating, using the processing unit of the server, a straight-line segment from the immediately preceding location to the artery entrance location prior to selecting the artery entrance location as the candidate location and determining, using the processing unit of the server, a laterally displaced location when the straight-line segment intersects any of the polygonal obstructions, wherein the laterally displaced location is determined using a y-axis coordinate of the immediately preceding location and an x-axis coordinate of the raw estimated location. The method can further involve selecting, using the processing unit of the server, the laterally displaced location as the candidate location.

The method can also involve comparing, using the processing unit of the server, the raw estimated location of the device in the coordinate plane with coordinates representing borders of the polygonal obstructions prior to calculating the straight-line path and determining, using the processing unit of the server, the raw estimated location is within the borders of one of the polygonal obstructions. The method can further involve adjusting, using the processing unit of the server, at least one coordinate of the raw estimated location to place the raw estimated location outside of the borders of the polygonal obstruction.

The method can also involve setting, using the processing unit of the server, a saturated location as the new location of the device when the hypothetical velocity calculated using the elapsed time and the distance separating the immediately preceding location and the weighted-average location is greater than the saturation velocity. The saturated location can be generated using the saturation velocity and the saturated location can be closer in distance to the immediately preceding location than the weighted-average location.

A non-transitory computer-readable medium comprising instructions stored thereon is also disclosed. The instructions, when executed by a processing unit, can perform the method steps mentioned above. The methods, devices, or systems disclosed herein may be implemented in a variety of different ways. Certain embodiments have other steps or elements in addition to or in place of those mentioned above. The steps or elements will become apparent to those skilled in the art from the accompanying drawings or from the detailed description that follows.

DETAILED DESCRIPTION OF THE INVENTION

Figure 3:
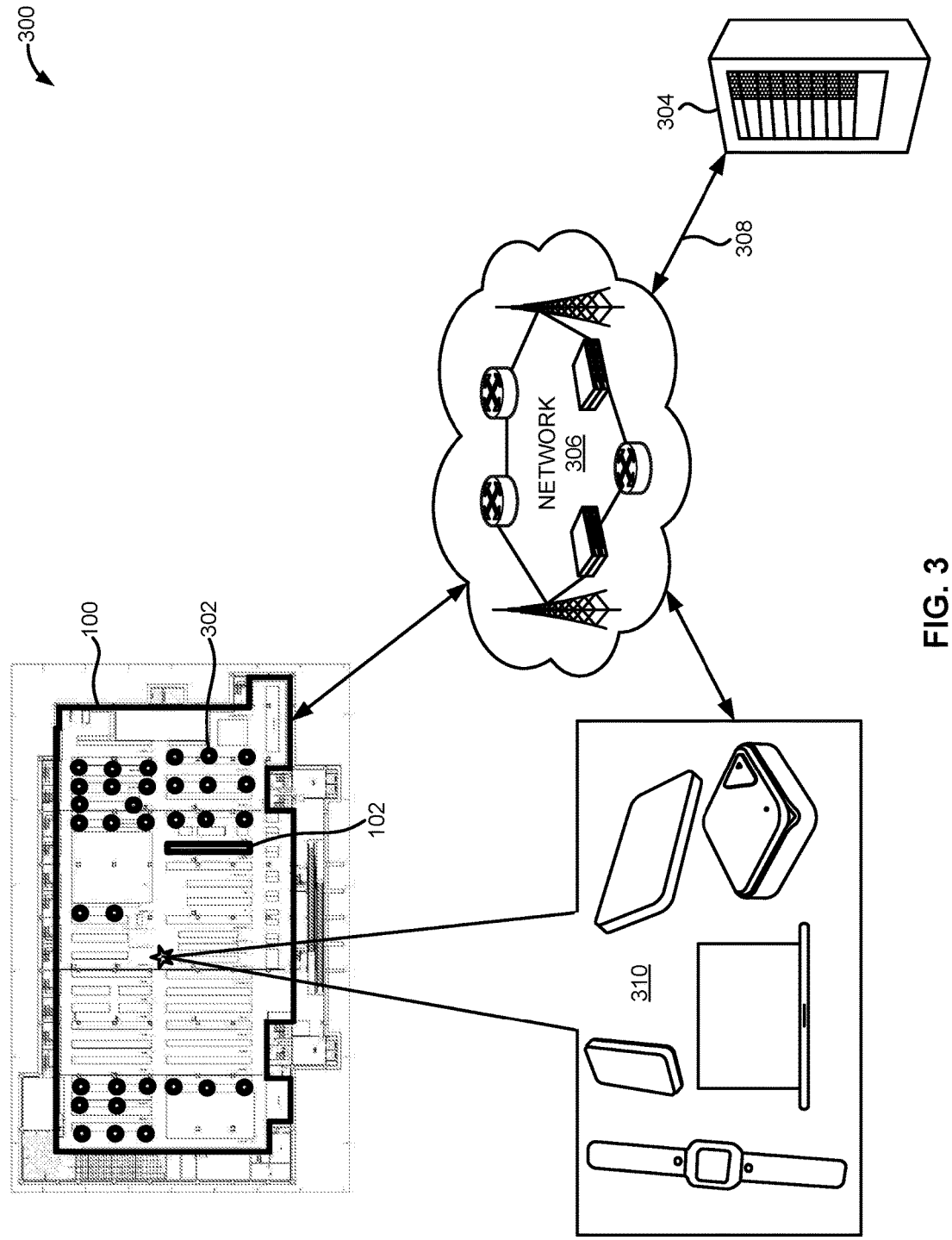
FIG. 3 illustrates a schematic of a variation of a device localization system.

FIG. 3 illustrates a system 300 for tracking a device 310 in an indoor environment 100 having polygonal obstructions 102. The indoor environment 100 can include any enclosed environment having walls, a floor, and a roof, ceiling, or a partial roof or ceiling. The indoor environment 100 can include a retail environment such as a retail store or supermarket, an entertainment venue, a sporting venue, a cultural venue such as a museum, a warehouse or storage environment, an auditorium, a dining establishment, an academic institution such as a school or lecture hall, an office or workplace, a residential building, or any combination thereof. The polygonal obstructions 102 can include a retail shelf or counter, a retail fixture or display, a wall or other load supporting structure, a fixed set of seats or tables, a storage rack or shelf, a fixed set of gaming machines or entertainment kiosks, or any combination thereof.

The system 300 includes a server 304 communicatively coupled to the device 310 through a network 306. The network 306 can be any multi-hop network that covers regions, countries, continents, or a combination thereof. Examples of the network 306 can include a cellular network such as a 3G network, a 4G network, a long-term evolution (LTE) network; a sonic communication network; a satellite network; a wide area network such as the Internet, or a combination thereof.

The system 300 can also include a number of wireless signal transceivers 302 positioned throughout the indoor environment 100. In one variation, the wireless signal transceivers 302 can include an already-deployed network of wireless access points, such as WiFi access points. In this variation, the device 310 can be in wireless communication with the server 304 over the network 306 via at least one of the wireless signal transceivers 302 or via another network such as a cellular or satellite network. The wireless signal transceivers 302 can include WiFi routers or any component or device capable of establishing a network using the IEEE's 802.11 protocols or specifications.

In another variation, the wireless signal transceivers 302 can include only an overlay network of beacons such as Bluetooth® beacons or WiFi beacons. In this variation, the device 310 can be in wireless communication with the server 304 via a cellular or satellite network or via a wireless access point which is not a part of the beacon network. In yet another variation, the wireless signal transceivers 302 can include both an already-deployed network of wireless access points and an overlay network of beacons or access points.

The server 304, the device 310, and the wireless signal transceivers 302 can be communicatively coupled to the network 306 through connections 308. The connections 308 can include wireless connections, wired connections, or a combination thereof.

The server 304 can be a centralized server or a de-centralized server. For example, the server 304 can be a cloud server, a cluster server, a part of a server farm, or a combination thereof. The server 304 can be a rack mounted server, a blade server, a mainframe, a dedicated desktop or laptop computer, or a combination thereof. The server 304 can be a virtualized computing resource, a grid computing resource, a peer-to-peer distributed computing resource, or a combination thereof. The device 310 can include a portable wireless device such as a smartphone, a tablet, a laptop, a smartwatch or other wearable device, a health monitor, a personal entertainment device, a tracking device, or a combination thereof.

While FIG. 3 depicts an embodiment using one instance of each of the server 304 and the device 310, it should be understood by one of ordinary skill in the art that the system 300 can include a plurality of servers 304 such as a distributed server system or a cloud server and a plurality of devices 310.

Figure 4B:
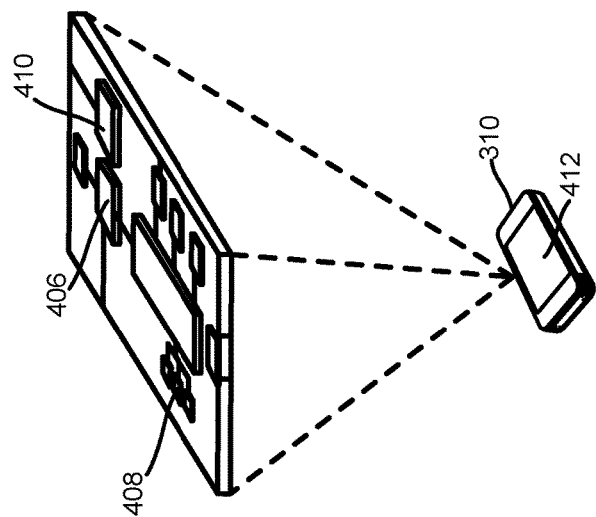
FIG. 4B illustrates a variation of a portable wireless device of the device localization system.
Figure 4A:
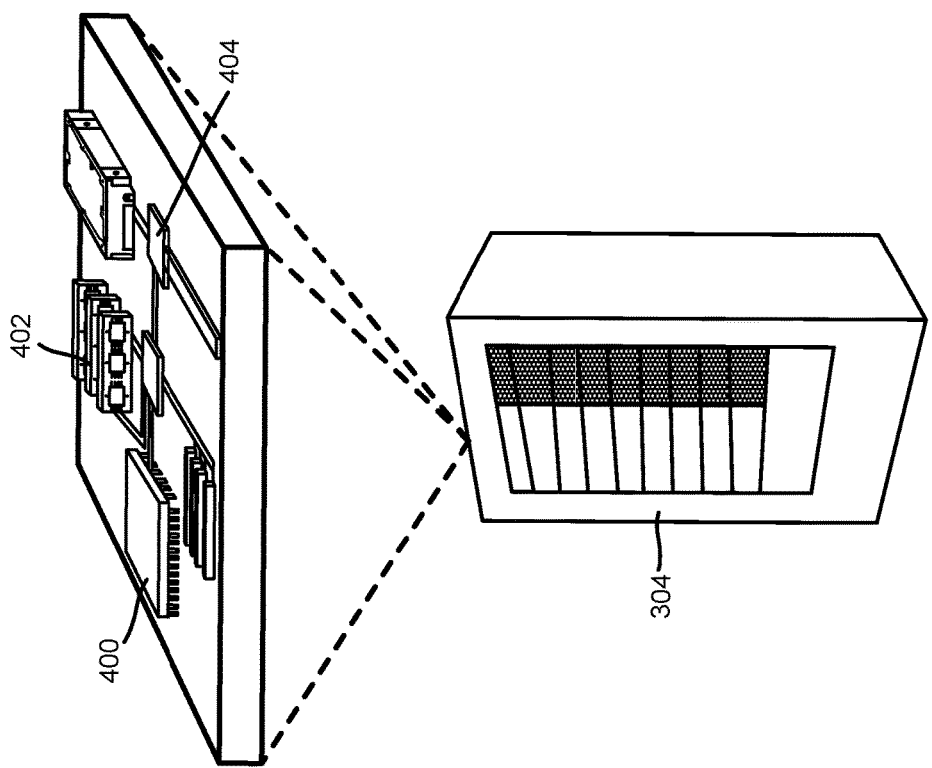
FIG. 4A illustrates a variation of a server of the device localization system.

FIG. 4A illustrates an embodiment of the server 304 of the system 300. The server 304 can have a processing unit 400, a memory unit 402, and a server communication unit 404. The processing unit 400 can be coupled to the memory unit 402 and the server communication unit 404 through high-speed buses.

The processing unit 400 can include one or more central processing units (CPUs), graphical processing units (GPUs), Application-Specific Integrated Circuits (ASICs), field-programmable gate arrays (FPGAs), or a combination thereof. The processing unit 400 can execute software stored in the memory unit 402 to execute the methods or instructions described herein. The processing unit 400 can be implemented in a number of different manners. For example, the processing unit 400 can be an embedded processor, a processor core, a microprocessor, a logic circuit, a hardware finite state machine (FSM), a digital signal processor (DSP), or a combination thereof. As a more specific example the processing unit 400 can be a 64-bit processor.

The memory unit 402 can store software, data, logs, or a combination thereof. The memory unit 402 can be an internal memory as shown in FIG. 4A. Although not shown in the figures, it is contemplated by this disclosure that the memory unit 402 can be an external memory, such as a memory residing on a storage node, a cloud server, or a storage server. The memory unit 402 can be a volatile memory or a non-volatile memory. For example, the memory unit 402 can be a nonvolatile storage such as non-volatile random access memory (NVRAM), Flash memory, disk storage, or a volatile storage such as static random access memory (SRAM). The memory unit 402 can be the main storage unit for the server 304.

The server communication unit 404 can include one or more wired or wireless communication interfaces. For example, the server communication unit 404 can be a network interface card of the server 304. The server communication unit 404 can be a wireless modem or a wired modem. In one embodiment, the server communication unit 404 can be a WiFi modem. In other embodiments, the server communication unit 404 can be a 3G modem, a 4G modem, an LTE modem, a Bluetooth™ component, a radio receiver, an antenna, or a combination thereof. The server 304 can connect to or communicatively couple with the wireless signal transceivers 302, the network 306, or a combination thereof using the server communication unit 404. The server 304 can transmit or receive packets or messages using the server communication unit 404.

FIG. 4B illustrates an embodiment of the device 310. The device 310 can have a processor 406, a memory 408, a wireless communication module 410, and a display 412. The processor 406 can be coupled to the memory 408, and the wireless communication module 410 through high-speed buses.

The processor 406 can include one or more CPUs, GPUs, ASICs, FPGAs, or a combination thereof. The processor 406 can execute software stored in the memory 408 to execute the methods or instructions described herein. The processor 406 can be implemented in a number of different manners. For example, the processor 406 can be an embedded processor, a processor core, a microprocessor, a logic circuit, a hardware FSM, a DSP, or a combination thereof. As a more specific example the processor 406 can be a 32-bit processor such as an ARM™ processor.

The memory 408 can store software, data, logs, or a combination thereof. In one embodiment, the memory 408 can be an internal memory. In another embodiment, the memory 408 can be an external storage unit. The memory 408 can be a volatile memory or a non-volatile memory. For example, the memory 408 can be a nonvolatile storage such as NVRAM, Flash memory, disk storage, or a volatile storage such as SRAM. The memory 408 can be the main storage unit for the device 310.

The wireless communication module 410 can include a wireless communication interface or chip. For example, the wireless communication module 410 can be a network interface card of the device 310. The wireless communication module 410 can be a wireless modem. In one embodiment, the wireless communication module 410 can be a WiFi modem. In other embodiments, the wireless communication module 410 can be a 3G modem, a 4G modem, an LTE modem, a Bluetooth™ component, a radio receiver, an antenna, or a combination thereof. The device 310 can connect to or communicatively couple with the wireless signal transceivers 302, the network 306, or a combination thereof using the wireless communication module 410. The device 310 can transmit or receive packets or messages using the wireless communication module 410.

In one variation, the device 310 can also comprise a locational unit having a GPS receiver, an inertial unit, a magnetometer, a compass, or a combination thereof. The GPS receiver can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 412 can be a touchscreen display such as a liquid crystal display (LCD), a thin film transistor (TFT) display, an organic light-emitting diode (OLED) display, or an active-matrix organic light-emitting diode (AMOLED) display. In certain embodiments, the display 412 can be a retina display, a haptic touchscreen, or a combination thereof. For example, when the device 310 is a smartphone, the display 412 can be the touchscreen display of the smartphone.

Figure 5:
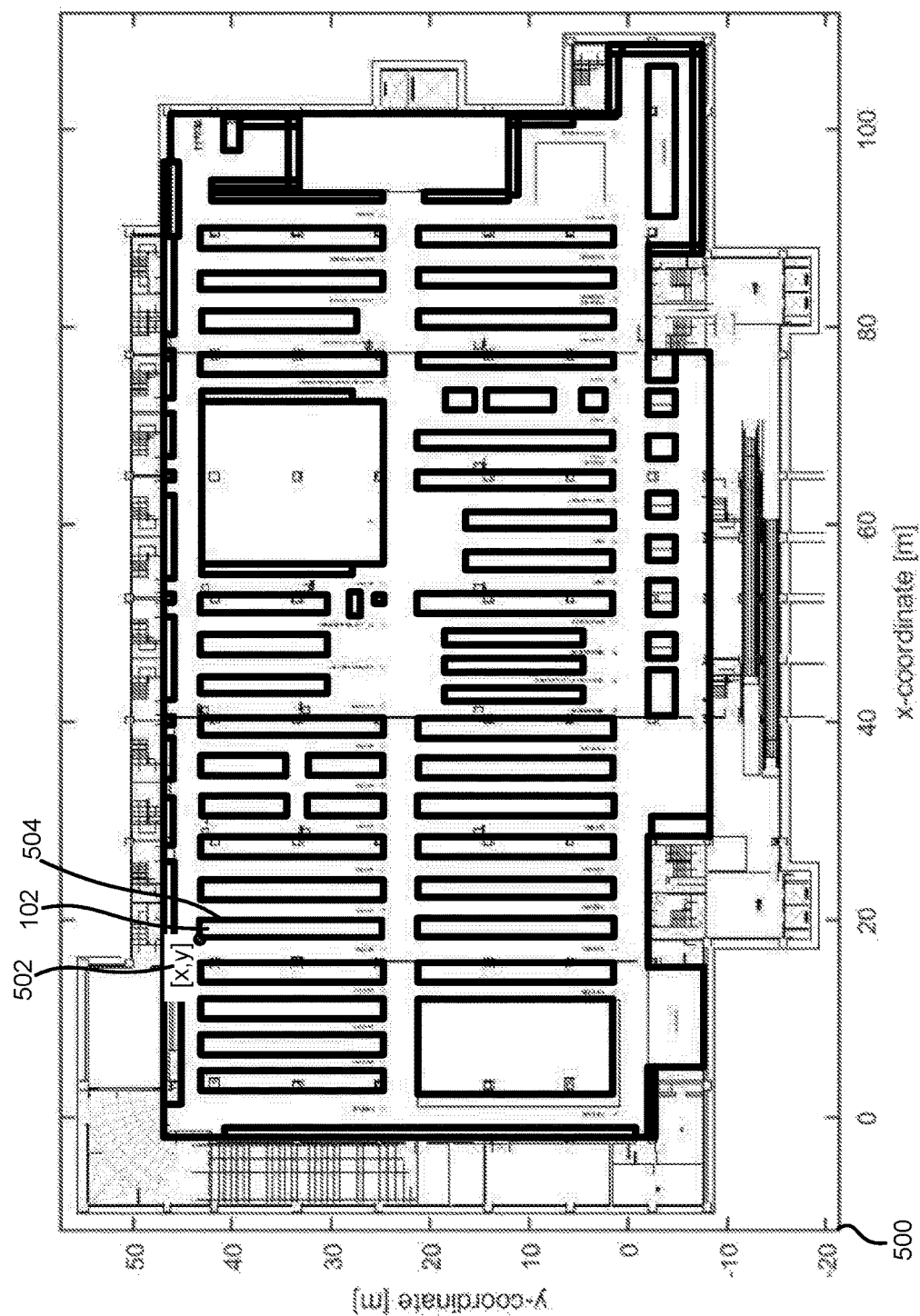
FIG. 5 illustrates a representation of an indoor environment in a coordinate plane.

FIG. 5 illustrates a representation of the indoor environment 100 in a coordinate plane 500. In one variation, the coordinate plane 500 can be a rectilinear two-dimensional Cartesian plane including an x-axis and a y-axis. In other variations, the system 300 can represent the indoor environment 100 in a three-dimensional coordinate system including an x-axis, a y-axis, and a z-axis.

As shown in FIG. 5, the indoor environment 100 can have a number of polygonal obstructions 102. For example, the indoor environment 100 can represent a retail store of approximately 5000 square meters.

The polygonal obstructions 102 can be physical barriers which hinder or impede the movement of a user, vehicle, or machine carrying the device 310 in the indoor environment 100. In one variation, the polygonal obstructions 102 can be substantially rectangular-shaped obstructions having an x-dimension (e.g., width) and a y-dimension (e.g., length). In this variation, the polygonal obstructions 102 can represent store shelves, product displays, warehouse shelves, counters, rooms or cubicles, or a combination thereof within the indoor environment 100.

In other variations not shown in the figures but contemplated by this disclosure, at least part of the methods described herein can be applied to polygonal obstructions 102 shaped as triangles, non-rectangular quadrilaterals such as trapezoids, *rhombi*, or parallelograms, pentagons, hexagons, heptagons, octagons, nonagons, or polygons having ten or more sides.

The system 300 can initially map the indoor environment 100 having the polygonal obstructions 102 in the coordinate plane 500. The system 300 can store the geometry of the indoor environment 100 including the coordinates 502 of the borders 504 of the polygonal obstructions 102 and the borders 504 of the indoor environment 100 in a database accessible to the server 304. The system 300 can treat the polygonal obstructions 102 as keep-out zones. As will be discussed in the following sections, the system 300 can consider a location of the device 310 as invalid when the coordinates 502 of the location is within the borders 504 of at least one of the polygonal obstructions 102.

The system 300 can construct a floorplan of the indoor environment 100 using digital images of the indoor environment 100. The system 300 can also generate the polygonal obstructions 102 using automated feature extraction.

Figure 6:
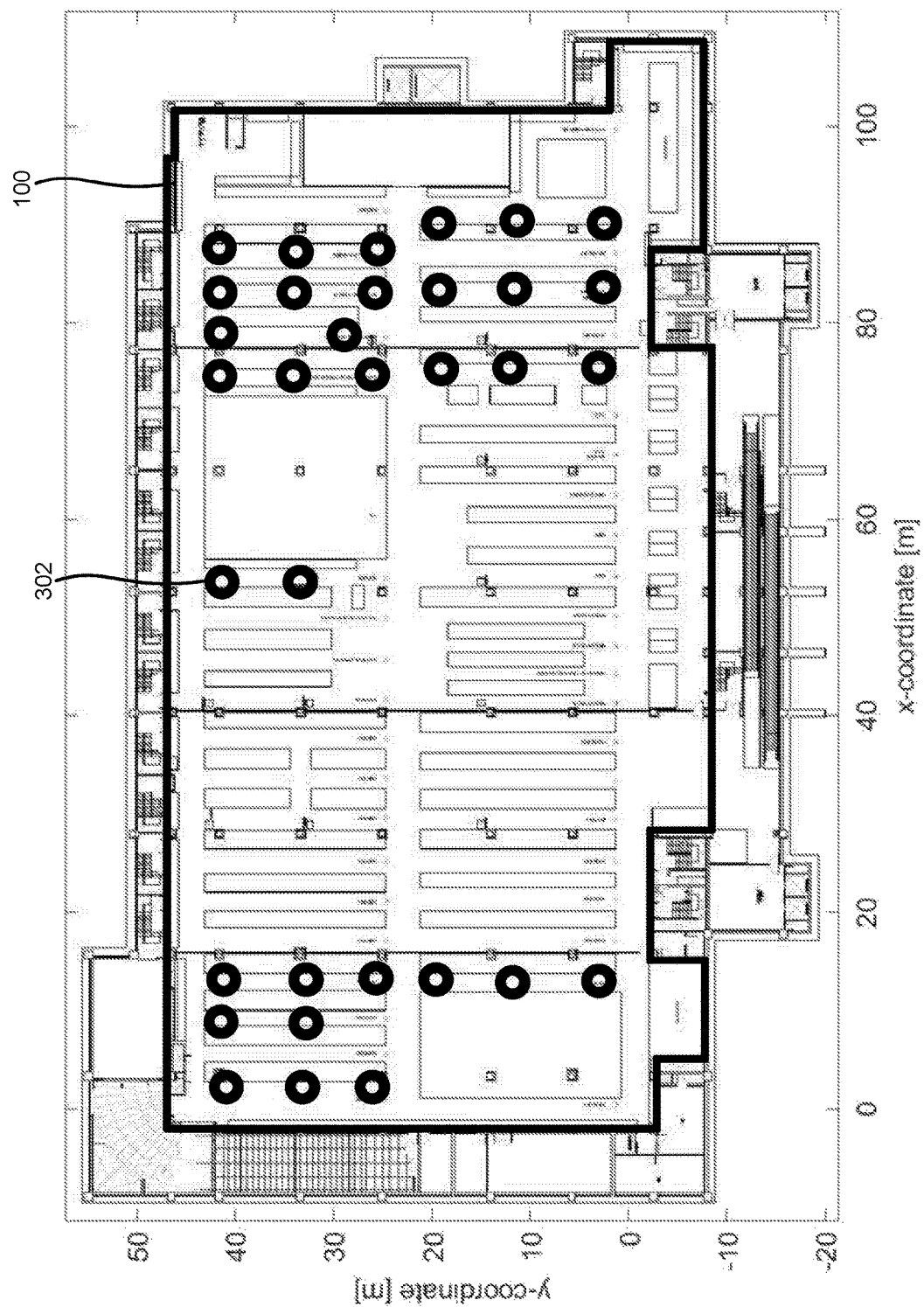
FIG. 6 illustrates a representation of an indoor environment having 33 wireless signal transceivers.

FIG. 6 illustrates a variation of the system 300 having 33 wireless signal transceivers 302 positioned throughout the indoor environment 100. As can be seen in FIG. 6, the wireless signal transceivers 302 can be placed on or above the polygonal obstructions 102. In other variations, the wireless signal transceivers 302 can be placed on at least one wall or ceiling of the indoor environment 100.

In one variation, the wireless signal transceivers 302 can be substantially equally spaced from one another. In other variations, the wireless signal transceivers 302 can be evenly spaced within the indoor environment 100 without any significant concentrations or congregations of wireless signal transceivers 302 in any one portion of the indoor environment 100.

In additional variations, the wireless signal transceivers 302 can be congregated in select sections of the indoor environment 100. For example, as depicted in FIG. 6, approximately one-third of the wireless signal transceivers 302 can be positioned on polygonal obstructions 102 near one end of the indoor environment 100 and the remaining wireless signal transceivers 302 can be positioned on polygonal obstructions 102 near the opposite end of the indoor environment 100. In this variation, two or three wireless signal transceivers 302 can also be placed substantially in the middle of the indoor environment 100 in between the two congregations of wireless signal transceivers 302.

Figure 7:
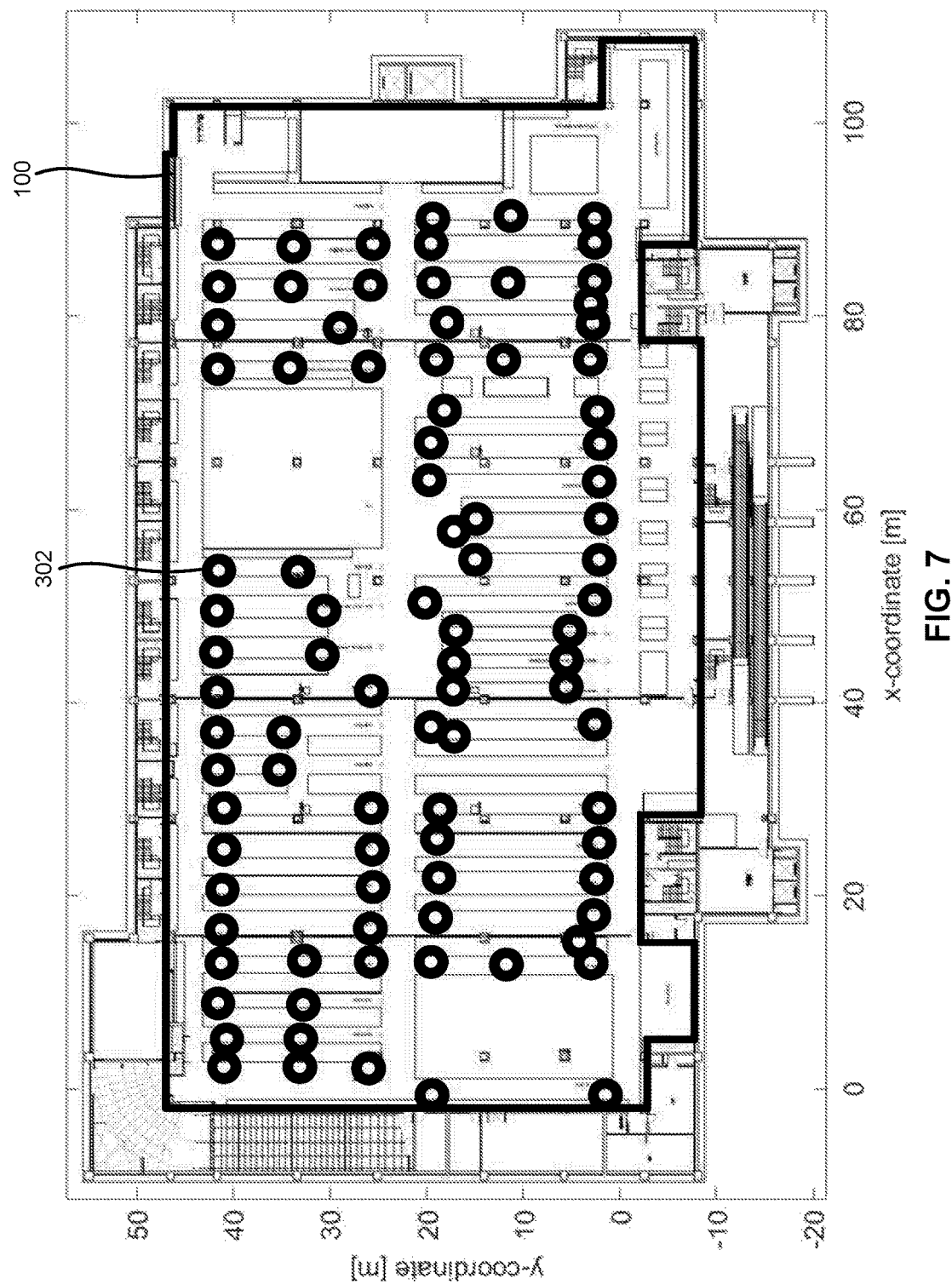
FIG. 7 illustrates a representation of an indoor environment having 87 wireless signal transceivers.

FIG. 7 illustrates a variation of the system 300 having 87 wireless signal transceivers 302 positioned throughout the indoor environment 100. As can be seen in FIG. 7, the wireless signal transceivers 302 can be placed on or above the polygonal obstructions 102. In the variation shown in FIG. 7, the wireless signal transceivers 302 can be evenly spaced within the indoor environment 100 and cover the entire indoor environment 100. Also, in this variation, each polygonal obstruction 102 having a length dimension of at least 15 meters can have at least two wireless signal transceivers 302 positioned on or above the polygonal obstruction 102.

It should be understood by one of ordinary skill in the art that although specific numbers of wireless signal transceivers 302 are shown in FIGS. 6 and 7, the actual number of wireless signal transceivers 302 deployed can increase or decrease based on the size or dimensions of the indoor environment 100. In one variation, the system 300 can operate with approximately one wireless signal transceiver per 50 square meters of the indoor environment 100. In another variation, the system 300 can operate with approximately one wireless signal transceiver per 160 square meters of the indoor environment 100. In other variations, the system 300 can operate with one wireless signal transceiver per 50 to 160 square meters of the indoor environment 100. For example, the system 300 can operate with approximately one wireless signal transceiver per 57 square meters. Also, for example, the system 300 can operate with approximately one wireless signal transceiver per 150 square meters of the indoor environment 100.

Figure 8:
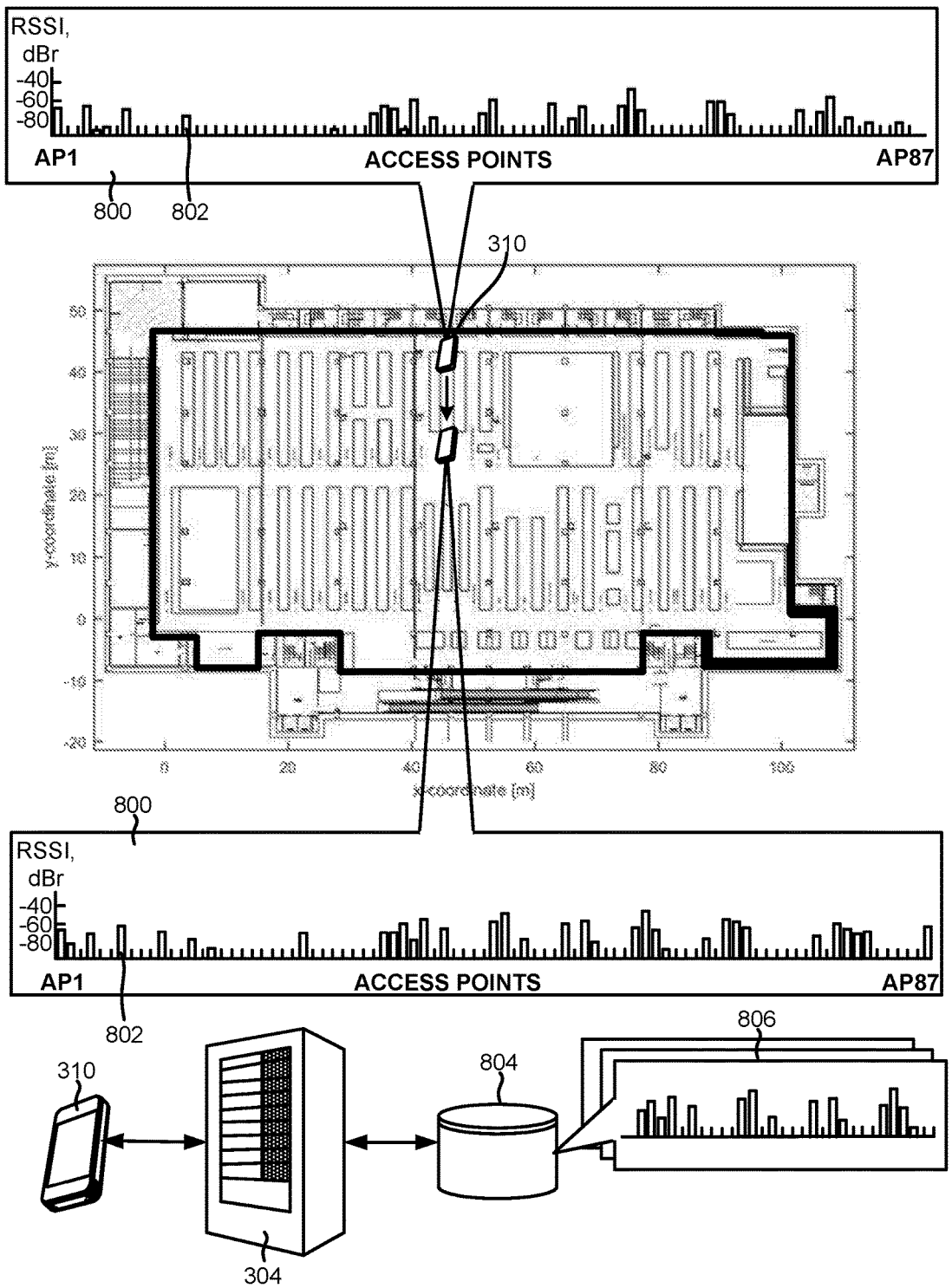
FIG. 8 illustrates the system determining a raw estimated location using signal strength profiles.

FIG. 8 illustrates the system 300 determining an estimated location of the device 310 using signal strength profiles 800. For example, the estimated location of the device 310 can be used as a raw estimated location 900 (see FIGS. 9, 10A, 10B, 11A, 11B, 12A, and 12B). In one variation, the server 304 can receive a signal strength profile 800 from the device 310 located in the indoor environment 100. The signal strength profile 800 can include measurements of the radio signal strengths of the wireless signal transceivers 302 positioned throughout the indoor environment 100. The signal strength profile 800 can include received signal strength indicators (RSSIs) measured in decibels relative to a reference level (dBr). The signal strengths 802 can be the power of the received radio signals measured at the device 310 at a specific location in the indoor environment 100. The signal strengths 802 of the wireless signal transceivers 302 can change as the location of the device 310 in the indoor environment 100 changes due to a movement of a user or vehicle carrying the device 310.

For example, when the wireless signal transceivers 302 are WiFi access points, the signal strength profile 800 can be a WiFi fingerprint of the various WiFi access points in the indoor environment 100. As shown in FIG. 8, a variation of the system 300 can have 87 WiFi access points located throughout the indoor environment 100. The WiFi access points can be positioned in the indoor environment 100 substantially equivalent to the arrangement shown in FIG. 7.

As depicted in FIG. 8, the signal strengths 802 of the wireless signal transceivers 302 measured by the device 310 can change as the location of the device 310 changes in the indoor environment 100. For example, the device 310 can change location as a user carrying the device 310 moves down an aisle or walkway of the indoor environment 100.

After receiving the signal strength profile 800 from the device 310, the processing unit 400 of the server 304 can be programmed to determine the raw estimated location 900 of the device 310 in the coordinate plane 500 representing the indoor environment 100 by using a K-nearest neighbor (KNN) algorithm to compare the signal strength profile 800 with reference profiles 806 stored in a database 804. In one variation, the server 304 can be programmed to determine the raw estimated location 900 of the device 310 in the coordinate plane 500 representing the indoor environment 100 by using a weighted K-nearest neighbor (WKNN) algorithm to compare the signal strength profile 800 with reference profiles 806 stored in the database. For example, the WKNN algorithm can use K=4 neighbors.

For example, the system 300 can determine the raw estimated location 900 of the device 310 in the indoor environment 100 using a variation of the weighted K-nearest neighbor algorithms described in Shin, Beomju, et al. "Enhanced weighted K-nearest neighbor algorithm for indoor Wi-Fi positioning systems." *Computing Technology and Information Management (ICCM)*, 2012 8th International Conference on. Vol. 2. IEEE, 2012; Yassin, Mohamad, and Elias Rachid. "A survey of positioning techniques and location based services in wireless networks." *Signal Processing, Informatics, Communication and Energy Systems (SPICES)*, 2015 IEEE International Conference; Tsai, W. M., L. T. Hsu, and S. S. January "The development of an indoor location based service test bed." Proceedings of the 22nd International Technical Meeting of the Satellite Division of the Institute of Navigation (ION GNSS 2009) 2001; Bahl, Paramvir, and Venkata N. Padmanabhan. "RADAR: An in-building RF-based user location and tracking system." INFOCOM 2000. Nineteenth Annual Joint Conference of the IEEE Computer and Communications Societies. Proceedings. IEEE. Vol. 2. IEEE, 2000; and Li, Binghao, et al. "Method for yielding a database of location fingerprints in WLAN." IEE Proceedings-Communications 152.5 (2005): 580-586, the contents of which are hereby incorporated by reference in their entireties.

The reference profiles 806 can be previously measured signal strengths of the same wireless signal transceivers 302 positioned within the same indoor environment 100. The previously measured signal strength profiles can be stored in a database 804 accessible to the server 304. In other variations, the reference profiles 806 can be previously measured signal strengths of different wireless signal transceivers 302 positioned within the same or similar indoor environment 100 in substantially the same arrangement. In yet another variation, the reference profiles 806 can be previously measured signal strengths of different wireless signal transceivers 302 positioned within an indoor environment 100 of substantially the same size or shape. The system 300 can populate the database 804 with the reference profiles 806 prior to receiving the signal strength profile 800 from the device 310.

In one variation, the database 804 can be stored in the memory unit 402. In another variation, the database 804 can be stored in a cloud storage system accessible to the server 304. In one variation, the database 804 can be one or more SQL databases. In other variations, the database 804 can be one or more document-oriented databases such as a NoSQL database.

In an alternative variation, the system 300 can receive a signal strength profile of the device 310 from the network of wireless signal transceivers 302. In this variation, the signal strength profile of the device 310 can include measurements of the signal strength of the device 310 as measured by the wireless signal transceivers 302. In this sense, the system 300 is essentially measuring the beacon-to-device path loss, which is irrespective of the source or destination of the signal.

Figure 9:
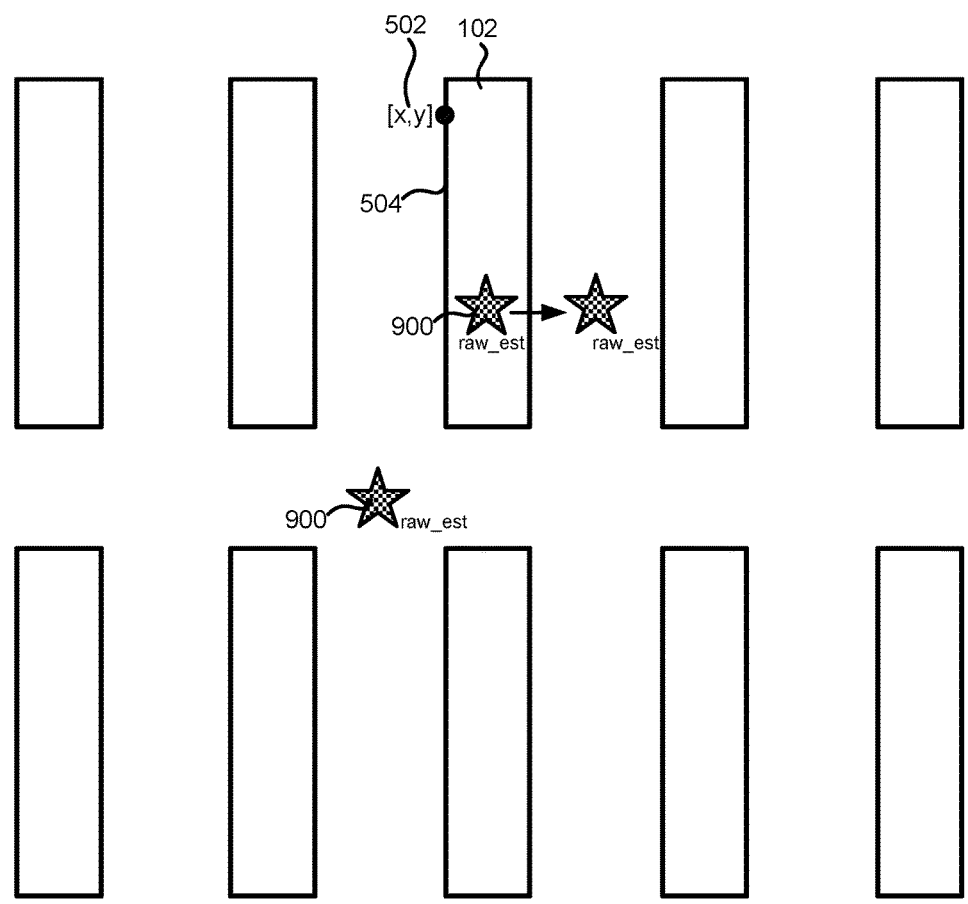
FIG. 9 illustrates the system performing an initial check of the raw estimated location.

FIG. 9 illustrates the system 300 performing an initial check of the raw estimated location 900 determined based on the signal strength profile 800 received from the device 310. FIG. 9 illustrates one scenario in which the raw estimated location 900 is located inside a polygonal obstruction 102 and another scenario in which the raw estimated location 900 is located in an aisle or walkway of the indoor environment 100 outside of any of the polygonal obstructions 102.

The processing unit 400 of the server 304 can be programmed to compare the raw estimated location 900 of the device 310 in the coordinate plane 500 with coordinates 502 representing borders 504 of the polygonal obstructions 102. When the processing unit 400 determines the raw estimated location 900 is within the borders 504 of one of the polygonal obstructions 102, the processing unit 400 can adjust at least one coordinate of the raw estimated location 900 to place the raw estimated location 900 outside of the borders 504 of the polygonal obstruction 102.

For example, the server 304 can execute the following code in order to determine whether the raw estimated location 900 is on or within the borders 504 of one of the polygonal obstructions 102:

```
if inpolygon(x_raw, y_raw, keepouts_x, keepouts_y) == true
    [x_raw, y_raw] = polyout(x_raw, y_raw, keepouts_x,
        keepouts_y);
end
```

In the above example code, the inpolygon( ) function serves to determine whether the raw estimated location 900 is inside or on one of the polygonal obstructions 102, the polyout( ) function returns the nearest point outside of a polygon obstruction 102 to a point inside that particular polygonal obstruction 102, and keepouts_x and keepouts_y are vectors of x-coordinates and y-coordinates, respectively, representing the polygonal obstructions 102. For example, the system 300 can adjust any of the x-coordinate, the y-coordinate, or both the x-coordinate and the y-coordinate of a raw estimated location 900 which is found to be on or inside a polygonal obstruction 102 to a location immediately outside of the polygonal obstruction 102. If the raw estimated location 900 is not determined to be within or on one of the polygonal obstructions 102, the system 300 can proceed to the next step of the process.

Although the code sections presented in this disclosure are written in the MATLAB® programming language, it should be understood by one of ordinary skill in the art that the methods and systems described herein can be implemented in other programming languages including the Python, C, C++, or Java® programming languages.

Figure 10A:
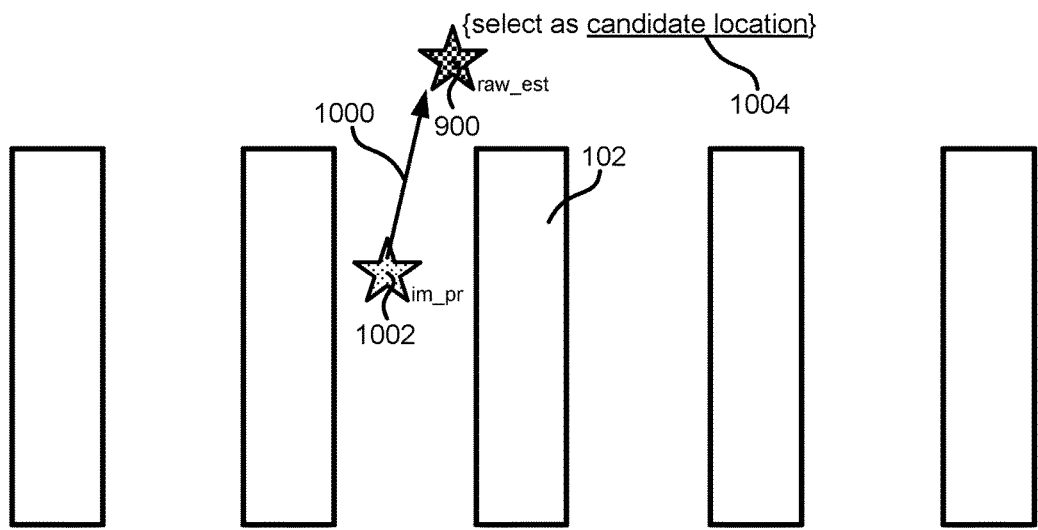
FIGS. 10A and 10B illustrate the system evaluating straight-line paths from an immediately preceding location to a raw estimated location.
Figure 10B:
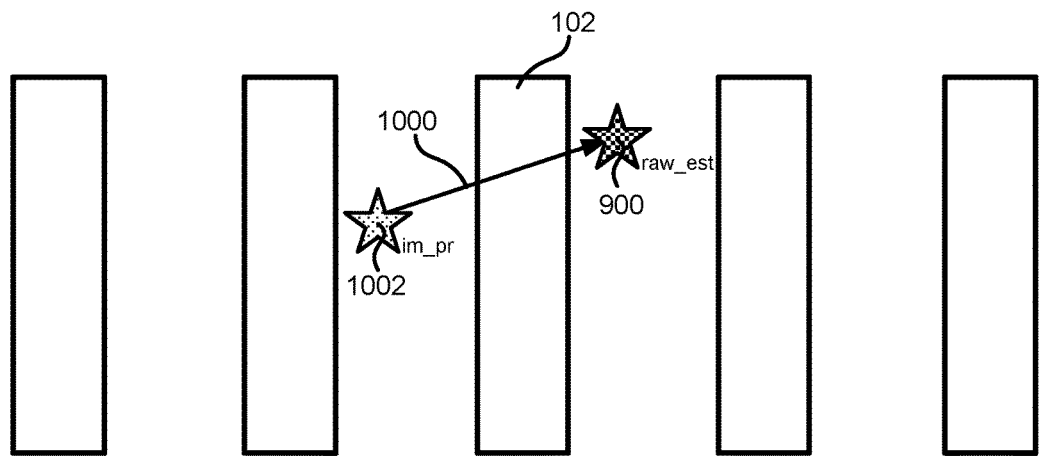

FIGS. 10A and 10B illustrate the system 300 evaluating straight-line paths 1000 from an immediately preceding location 1002 to a raw estimated location 900. The immediately preceding location 1002 can be a prior location of the device 310 determined using the filtering methods described in the following sections. For example, the immediately preceding location 1002 can be a previously calculated weighted-average location 1300 (see FIG. 13) of the device 310. The immediately preceding location 1002 can be represented by the coordinates [X1, Y1] in FIGS. 11A, 11B, 12A, and 12B.

The processing unit 400 of the server 304 can be programmed to calculate a straight-line path 1000 in the coordinate plane 500 from the immediately preceding location 1002 to the raw estimated location 900. The processing unit 400 of the server 304 can be programmed to select the raw estimated location 900 as a candidate location 1004 when the straight-line path 1000 connects the immediately preceding location 1002 and the raw estimated location 900 without intersecting any of the polygonal obstructions 102 in the coordinate plane 500.

As can be seen in FIG. 10A, the system 100 can select the raw estimated location 900 as the candidate location 1004 when a straight-line path 1000 connects the two locations without intersecting any part of a polygonal obstruction 102 in the indoor environment 100.

For example, the server 304 can execute the following code in order to determine whether a straight-line path 1000 connects the immediately preceding location 1002 and the raw estimated location 900 without intersecting any of the polygonal obstructions 102:

if isempty(polyxpoly([x_old x_raw], [y_old y_raw], keepouts_x, keepouts_y)) [x_est, y_est]=LPF(dt, x_old, y_old, x_raw, y_raw, p_gain, v_lim);

In the above example code, the polyxpoly( ) function returns the set of intersection point(s) of two polylines in a planar Cartesian system, the isempty( ) function is true when that set is the null set, x_old and y_old represent the immediately preceding location 1002, x_raw and y_raw represent the raw estimated location 900, and x_est and y_est represent the candidate location 1004. When the system 300 determines a straight-line path 1000 can connect the immediately preceding location 1002 with the raw estimated location 900 without intersecting any of the polygonal obstructions 102 in the indoor environment 100, the system 300 can select the raw estimated location 900 as the candidate location 1004 and pass the coordinates of the candidate location 1004 and an elapsed time, dt, to a low-pass filter function, LPF( ) to evaluate the feasibility of the estimated location of the device 310. The low-pass filter function will be discussed in the following sections.

Figure 11A:
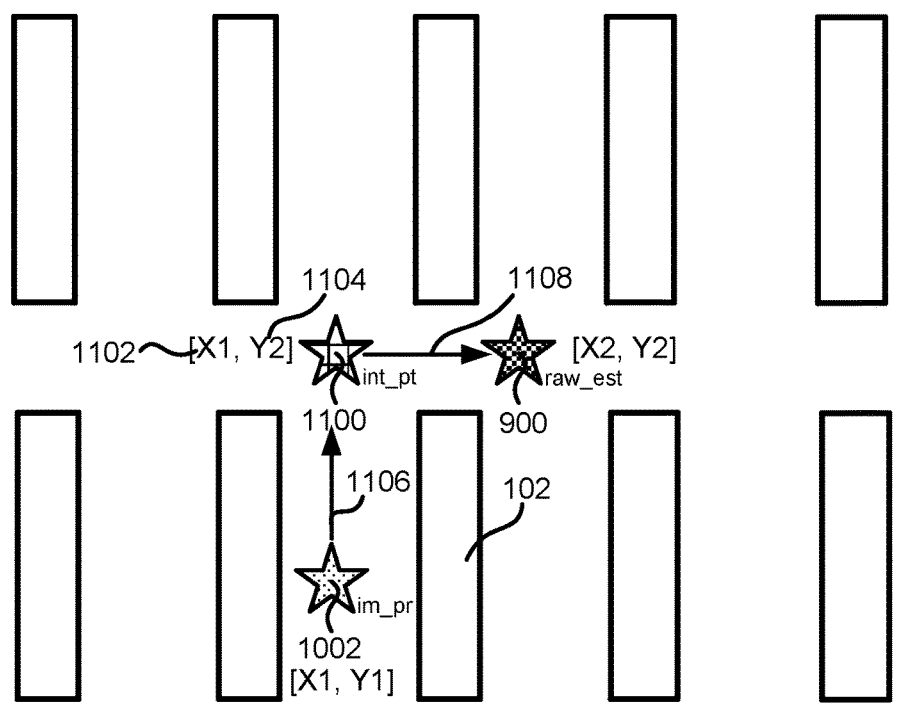
FIGS. 11A and 11B illustrate the system generating inter-linking points between an immediately preceding location and a raw estimated location.
Figure 11B:
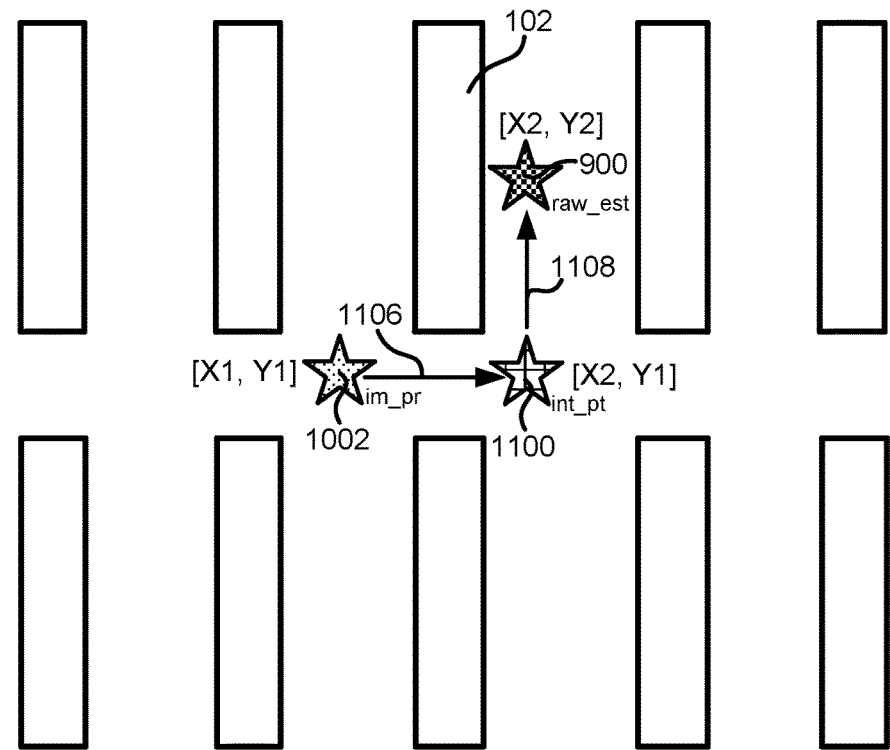

FIGS. 11A and 11B illustrate the system 300 generating interlinking points 1100 between an immediately preceding location 1002 and a raw estimated location 900. The processing unit 400 of the server 304 can generate an interlinking point 110 when the straight-line path 1000 connecting the immediately preceding location 1002 and the raw estimated location 900 intersects at least one part of a polygonal obstruction 102 in the coordinate plane 500 representing the indoor environment 100.

The processing unit 400 of the server 304 can be programmed to generate the interlinking point 1100 using an x-axis coordinate 1102 of the immediately preceding location 1002 and a y-axis coordinate 1104 of the raw estimated location 900. Upon generating the interlinking point 1100, the processing unit 400 can be programmed to then evaluate the interlinking point 1100 by calculating a first linear segment 1106 connecting the immediately preceding location 1002 with the interlinking point 1100. The processing unit 400 can be programmed to then calculate a second linear segment 1108 connecting the interlinking point 1100 with the raw estimated location 900. The processing unit 400 can be programmed to select the interlinking point 1100 as the candidate location 1004 when the first linear segment 1106 and the second linear segment 1108 do not intersect any part of a polygonal obstruction 102 in the coordinate plane 500.

If any of the first linear segment 1106 and the second linear segment 1108 intersects at least one of the polygonal obstructions 102 in the coordinate plane 500, the processing unit 400 can be programmed to generate another instance of the interlinking point 110 using the y-axis coordinate 1104 of the immediately preceding location 1002 and the x-axis coordinate 1102 of the raw estimated location 900. Upon generating this instance of the interlinking point 1100, the processing unit 400 can be programmed to evaluate this instance of the interlinking point 1100 by calculating a first linear segment 1106 connecting the immediately preceding location 1002 with this instance of the interlinking point 1100. The processing unit 400 can be programmed to then calculate a second linear segment 1108 connecting this instance of the interlinking point 1100 with the raw estimated location 900. The processing unit 400 can be programmed to select this instance of the interlinking point 1100 as the candidate location 1004 when the first linear segment 1106 and the second linear segment 1108 do not intersect any part of a polygonal obstruction 102 in the coordinate plane 500. As can be seen in FIGS. 11A and 11B, selecting the interlinking point 1100 as the candidate location 1004 prevents the route of the user, vehicle, or machine carrying the device 310 from traversing through any physical barriers in the indoor environment 100.

For example, server 304 can execute the following code in order to generate and evaluate the interlinking point 1100:

```
if isempty(polyxpoly([x_old x_old], [y_old y_raw], keepouts_x, keepouts_y)) &&
    isempty(polyxpoly([x_old x_raw], [y_raw y_raw], keepouts_x, keepouts_y))
        [x_est, y_est] = LPF(dt, x_old, y_old, x_old, y_raw, p_gain, v_lim);
elseif isempty(polyxpoly([x_old x_raw], [y_old y_old], keepouts_x, keepouts_y)) &&
    isempty(polyxpoly([x_raw x_raw], [y_old y_raw], keepouts_x, keepouts_y))
        [x_est, y_est] = LPF(dt, x_old, y_old, x_raw, y_old, p_gain, v_lim);
```

In the above example code, x_old and y_old represent the immediately preceding location 1002, x_raw and y_raw represent the raw estimated location 900, and x_est and y_est represent the candidate location 1004. When the interlinking point 1100 is selected as the candidate location 1004, the processing unit 400 of the server 304 can be programmed to pass the coordinates of the interlinking point 1100 and an elapsed time, dt, to a low-pass filter function, LPF( ), to evaluate the practicality of the estimated location of the device 310.

Figure 12A:
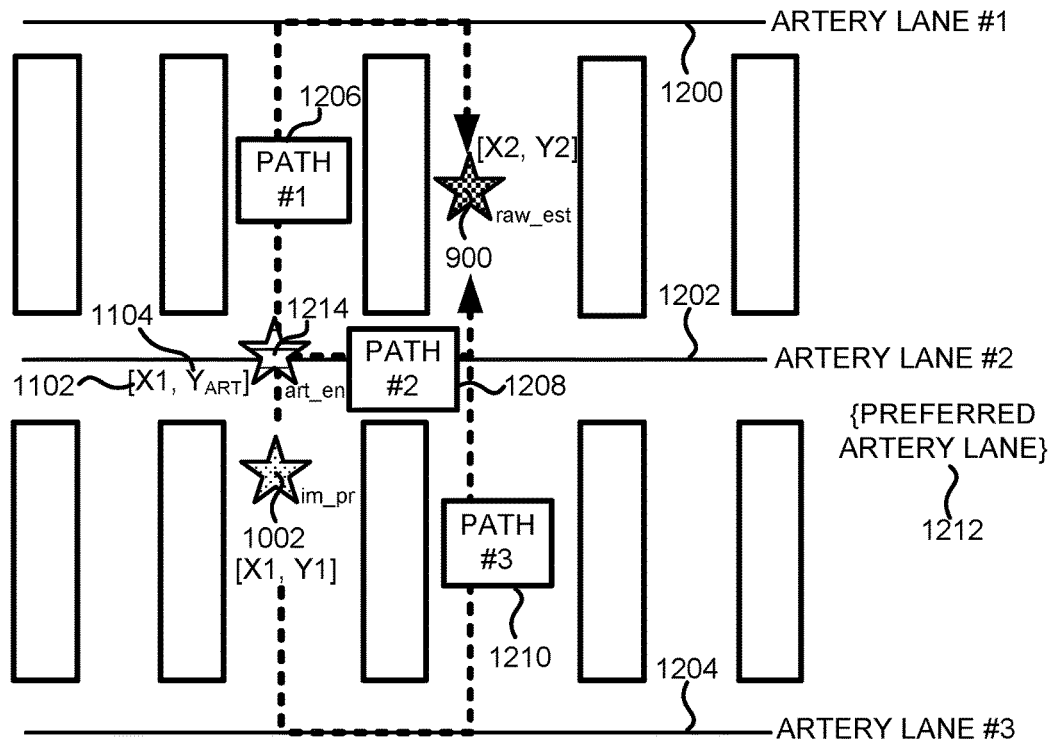
FIGS. 12A and 12B illustrate the system evaluating polyline paths from an immediately preceding location and a raw estimated location using artery lanes.
Figure 12B:
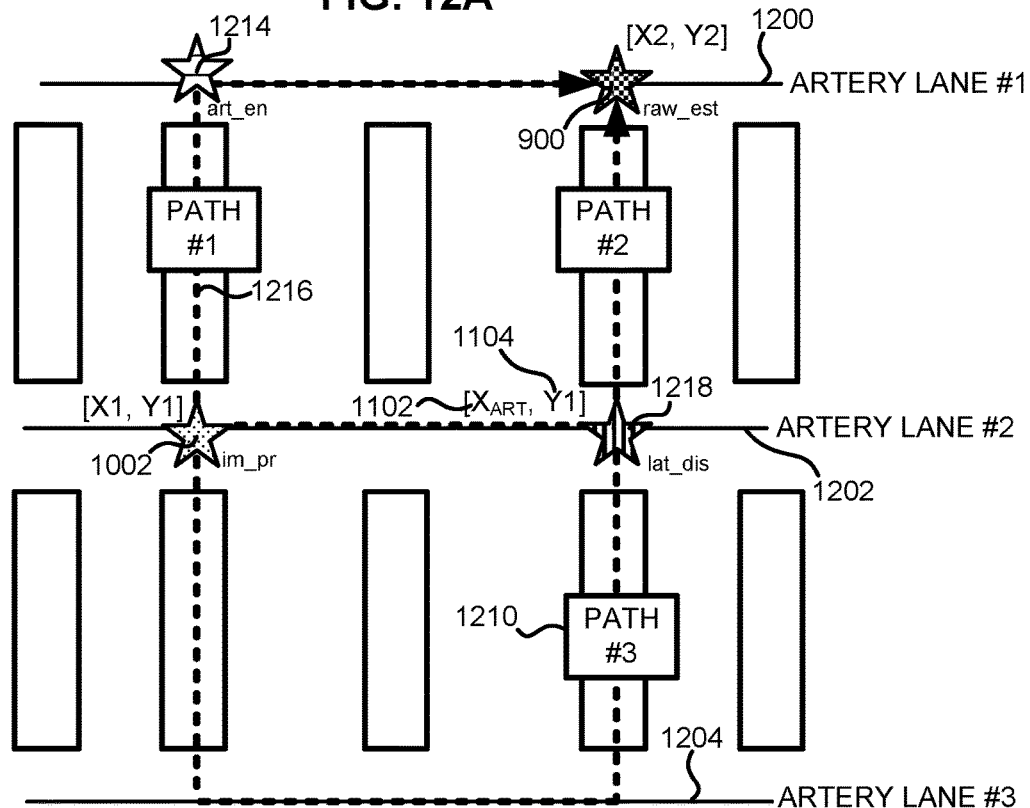

FIGS. 12A and 12B illustrate the system 300 evaluating polyline paths from the immediately preceding location 1002 and the raw estimated location 900 using artery lanes. The processing unit 400 of the server 304 can evaluate polyline paths when an interlinking point 1100 cannot be generated in which a first linear segment 1106 connecting the immediately preceding location 1002 and the interlinking point 1100 and a second linear segment 1108 connecting the interlinking point 1100 and the raw estimated location 900 do not intersect any part of a polygonal obstruction 102 in the coordinate plane 500.

The processing unit 400 of the server 304 can be programmed to determine a first polyline path 1206 from the immediately preceding location 1002 to the raw estimated location 900 wherein a portion of the first polyline path 1206 traverses a first artery lane 1200 in the indoor environment 100. As illustrated in FIGS. 12A and 12B, the artery lanes, including the first artery lane 1200, the second artery lane 1202, or the third artery lane 1204, can represent major aisles or walkways in the indoor environment 100. For example, the artery lanes, including any of the first artery lane 1200, the second artery lane 1202, or the third artery lane 1204, can be an aisle, a walkway, or a path connecting at least two or more other aisles, walkways, or paths in the indoor environment 100. In other variations, the artery lanes can be aisles, walkways, or paths extending from one side of the indoor environment 100 to the other or connecting one entrance or exit of the indoor environment 100 with another entrance or exist of the indoor environment 100. The artery lanes can be substantially parallel to at least one of the x-coordinate axis or the y-coordinate axis in the coordinate plane 500.

The polyline paths, such as the first polyline path 1206 and the second polyline path 1208, are routes or potential routes from one location in the coordinate plane 500 representing the indoor environment 100 to another location in the coordinate plane 500 which include at least two interconnected straight-line segments. Each of the polyline paths can traverse at least a portion of one artery lane in the indoor environment 100.

The coordinates 502 of the artery lanes can be predetermined by the system 300 and stored in the database 804. Although three artery lanes are shown in FIGS. 12A and 12B, it should be understood by one or ordinary skill in the art that the system 300 can operate in indoor environments 100 having any number of artery lanes including between 4 and 100 artery lanes.

Upon determining the first polyline path 1206, the processing unit 400 of the server 304 can be programmed to determine a second polyline path 1208 from the immediately preceding location 1002 to the raw estimated location 900 wherein a portion of the second polyline path 1208 traverses a second artery lane 1202 in the indoor environment 100. When the indoor environment 100 has only two artery lanes, the processing unit 400 of the server 304 can be programmed to select the first artery lane 1200 as a preferred artery lane 1212 when the first polyline path 1206 is shorter than the second polyline path 1208. Alternatively, the processing 400 of the server 304 can select the second artery lane 1202 as the preferred artery lane 1212 when the second polyline path 1208 is shorter than the first polyline path 1206.

The processing unit 400 of the server 304 can be programmed to then generate an artery entrance location 1214 using an x-axis coordinate 1102 of the immediately preceding location 1002 and a y-axis coordinate 1104 of the preferred artery lane 1212 or using the y-axis coordinate 1104 of the immediately preceding location 1002 and the x-axis coordinate 1102 of the preferred artery lane 1212. The processing unit 400 of the server 304 can be programmed to select the artery entrance location 1214 as the candidate location 1004 when a straight-line segment 1216 connecting the immediately preceding location 1002 to the artery entrance location 1214 does not intersect any part of a polygonal obstruction 102 in the coordinate plane 500.

When the indoor environment 100 has three or more artery lanes, as shown in FIGS. 12A and 12B, the processing unit 400 of the server 304 can be programmed to determine at least one polyline path from the immediately preceding location 1002 to the raw estimated location 900 for each of the artery lanes. For example, as shown in FIGS. 12A and 12B, the processing unit 400 of the server 304 can be programmed to determine the first polyline path 1206 traversing at least a portion of the first artery lane 1200, the second polyline path 1208 traversing at least a portion of the second artery lane 1202, and a third polyline path 1210 traversing at least a portion of the third artery lane 1204. The processing unit 400 of the server 304 can be programmed to then determine the shortest polyline path out of the three or more polyline paths and select the artery lane associated with the shortest polyline path as the preferred artery lane 1212.

The processing unit 400 of the server 304 can be programmed to then generate the artery entrance location 1214 using the x-axis coordinate 1102 of the immediately preceding location 1002 and the y-axis coordinate 1104 of the preferred artery lane 1212 or using the y-axis coordinate 1104 of the immediately preceding location 1002 and the x-axis coordinate 1102 of the preferred artery lane 1212. The processing unit 400 of the server 304 can be programmed to select the artery entrance location 1214 as the candidate location 1004 when a straight-line segment 1216 connecting the immediately preceding location 1002 to the artery entrance location 1214 does not intersect any part of a polygonal obstruction 102 in the coordinate plane 500.

When the processing unit 400 of the server 304 determines the straight-line segment 1216 connecting the immediately preceding location 1002 to the artery entrance location 1214 intersects any part of a polygonal obstruction 102 in the coordinate plane 500, the processing unit 400 of the server 304 can determine a laterally displaced location 1218 using the y-axis coordinate 1104 of the immediately preceding location 1002 and the x-axis coordinate 1104 of the raw estimated location 900.

Depending on the geometry of the indoor environment 100 and the geometry or arrangement of the polygonal obstructions 102, the processing unit 400 can determine a longitudinally displaced location using the x-axis coordinate 1102 of the immediately preceding location 1002 and the y-axis coordinate 1104 of the raw estimated location 900. In any case, a straight-line segment connecting the immediately preceding location 1002 and either the laterally displaced location 1218 or the longitudinally displaced location cannot intersect any part of a polygonal obstruction 102 in the coordinate plane 500 representing the indoor environment 100.

For example, server 304 can execute the following code in order to determine the polyline paths, selecting the artery entrance location 1214, or selecting the laterally displaced location 1218:

```
dist = abs(arteries_y − y_old) + abs(arteries_y − y_raw);
[~,idx] = min(dist);
y_trial = arteries_y(idx);
[x_est_trial, y_est_trial] = LPF(dt, x_old, y_old, x_old, y_trial,
   p_gain, v_lim);
if isempty(polyxpoly([x_old x_est_trial], [y_old y_est_trial],
   keepouts_x, keepouts_y))
       x_est = x_est_trial;
       y_est = y_est_trial;
   else
       [x_est, y_est] = LPF(dt, x_old, y_old, x_raw, y_old,
          p_gain, v_lim);
   end
```

In the above example code, x_old and y_old represent the immediately preceding location 1002, x_raw and y_raw represent the raw estimated location 900, and x_est and y_est represent the candidate location 1004. When either the artery entrance location 1214 or the laterally displaced location 1218 is selected as the candidate location 1004, the processing unit 400 of the server 304 can be programmed to pass the coordinates of either the artery entrance location 1214 or the laterally displaced location 1218 and an elapsed time, dt, to a low-pass filter function, LPF( ) to evaluate the practicality of the estimated location of the device 310.

Figure 13A:
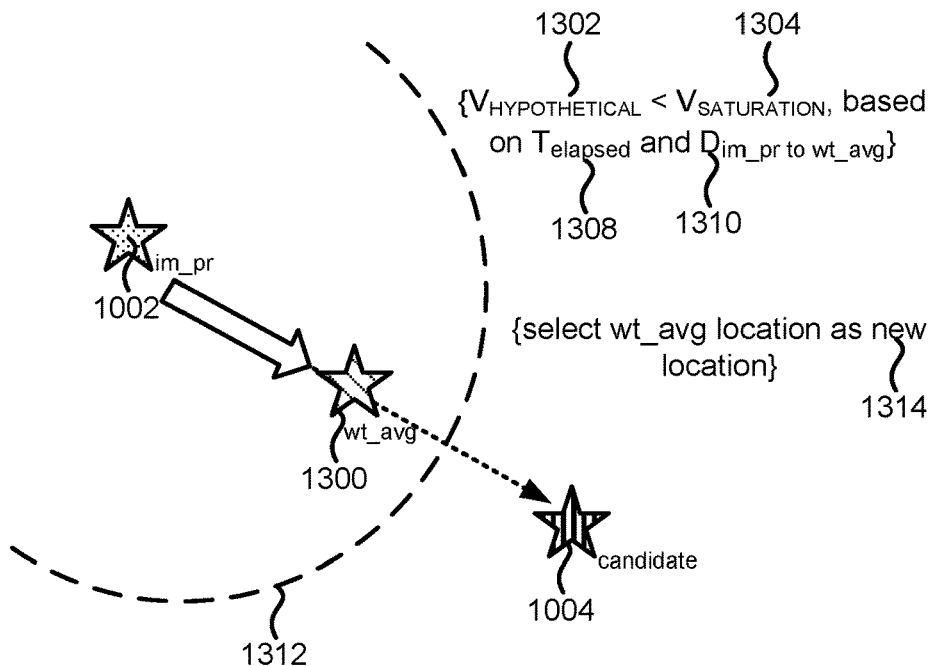
FIGS. 13A and 13B illustrate the system comparing hypothetical velocities with a saturation velocity.
Figure 13B:
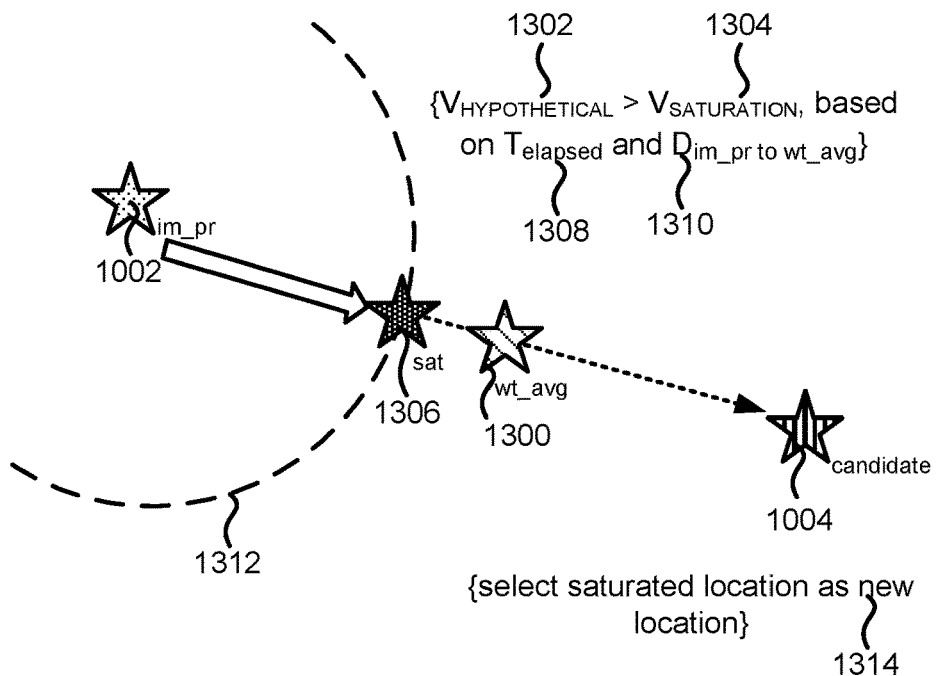

FIGS. 13A and 13B illustrate the system 300 calculating the weighted-average location 1300 and comparing a hypothetical velocity 1302 with a saturation velocity 1304 in order to evaluate the practicality of the estimated location of the device 310. The system 300 can calculate the weighted-average location 1300 and compare a hypothetical velocity 1302 with a saturation velocity 1304 as part of a low-pass smoothing filter function used to evaluate the practicality of the estimated location of the device 310.

Once a candidate location 1004 is set or selected, the processing unit 400 of the server 304 can be programmed to calculate a weighted-average location 1300 using the immediately preceding location 1002 and the candidate location 1004. Depending on the results of the algorithm steps described herein, the candidate location 1004 can be the raw estimated location 900, the location of the interlinking point 1100, artery entrance location 1214, or the laterally displaced location 1218. The system 300 can use any number of weighted-average formulas to calculate the weighted-average location 1300 using the immediately preceding location 1002 and the candidate location 1004.

The processing unit 400 of the server 304 can be programmed to then calculate a hypothetical velocity 1302 using an elapsed time 1308 (dt or Telapsed) and the distance 1310 separating the immediately preceding location 1002 and the weighted average location 1300. When the processing unit 400 can be programmed to then compare the hypothetical velocity 1302 with a saturation velocity 1304.

The saturation velocity 1304 is a predetermined velocity established using known limits or constraints, average or median speeds or velocities, or a combination thereof. For example, the saturation velocity 1304 can be between 1.0 meter to 3.0 meters per second. As a more specific example, the saturation velocity 1304 can be the average walking speed of a human being, or between 1.3 meters per second to 1.5 meters per second. In other variations, the saturation velocity 1304 can be predetermined based on the type of vehicle or entity carrying the device 310. For example, when the entity carrying the device 310 is a drone or robotic vehicle, the saturation velocity 1304 can be set based on the average or maximum velocity of such a drone or robotic vehicle.

The processing unit 400 can be programmed to compare the hypothetical velocity 1302 with the saturation velocity 1304 and store the weighted-average location 1300 as a new location 1314 of the device 310 when the hypothetical velocity 1302 is less than or equal to the saturation velocity 1304 as shown in FIG. 13A. Alternatively, when the processing unit 400 determines the hypothetical velocity 1302 is greater than the saturation velocity 1304 as shown in FIG. 13B, the processing unit 400 can be programmed to calculate a saturated location 1306 using the saturation velocity 1304, the elapsed time 1308, and the immediately preceding location 1002. The saturated location 1306 can be calculated by first calculating a displacement distance by multiplying the saturation velocity 1304 by the elapsed time 1308 and advancing the device 310 in the direction of the weighted average location 1300 by the displacement distance.

For example, the server 304 can execute the following code in order to determine the new location 1314:

```
dx = p_gain * (x_raw - x_old);
dy = p_gain * (y_raw - y_old);
dt = t_new - t_old;
v = hypot(dx, dy)/dt;
if v <= v_lim
    x_new = x_old + dx;
    y_new = y_old + dy;
else
    x_new = x_old + dx*(v_lim/v);
    y_new = y_old + dy*(v_lim/v);
end
```

The new location 1314 can be the location of the device 310 calculated using the above mentioned steps. The processing unit 400 of the server 304 can be programmed to then store the new location 1314 as the current location of the device 310 in the database 804 or another database accessible to the server 304. The system 300 can display the new location 1314 on a display of a device in communication with the server 304 or transmit the new location 1314 to a device in communication with the server 304.

Upon determining the new location 1314, the processing unit 400 can be programmed to do a final check to ensure the new location 1314 is not inside or on one of the polygonal obstructions 102 in the indoor environment 100. For example, the server 304 can execute the following code to ensure the new location 1314 is not inside or one of the polygonal obstructions 102:

```
if inpolygon(x_est, y_est, keepouts_x, keepouts_y) == true
    [x_est, y_est] = polyout(x_est, y_est, keepouts_x, keepouts_y);
end
```

As indicated above, if the processing unit 400 determines the new location 1314 is on or inside a polygonal obstruction 102, the processing unit 400 can pass the coordinates of the new location 1314 to the polyout( ) function to return a different set of coordinates immediately outside of the polygonal obstruction 102.

Once the server 304 determines the new location 1314 of the device 310, the server 304 can use the new location 1314 as a new instance of the immediately preceding location 1002. In doing so, the system 300 is able to improve the accuracy of its location estimates by continuously refining the inputs fed into the algorithm.

Figure 1:
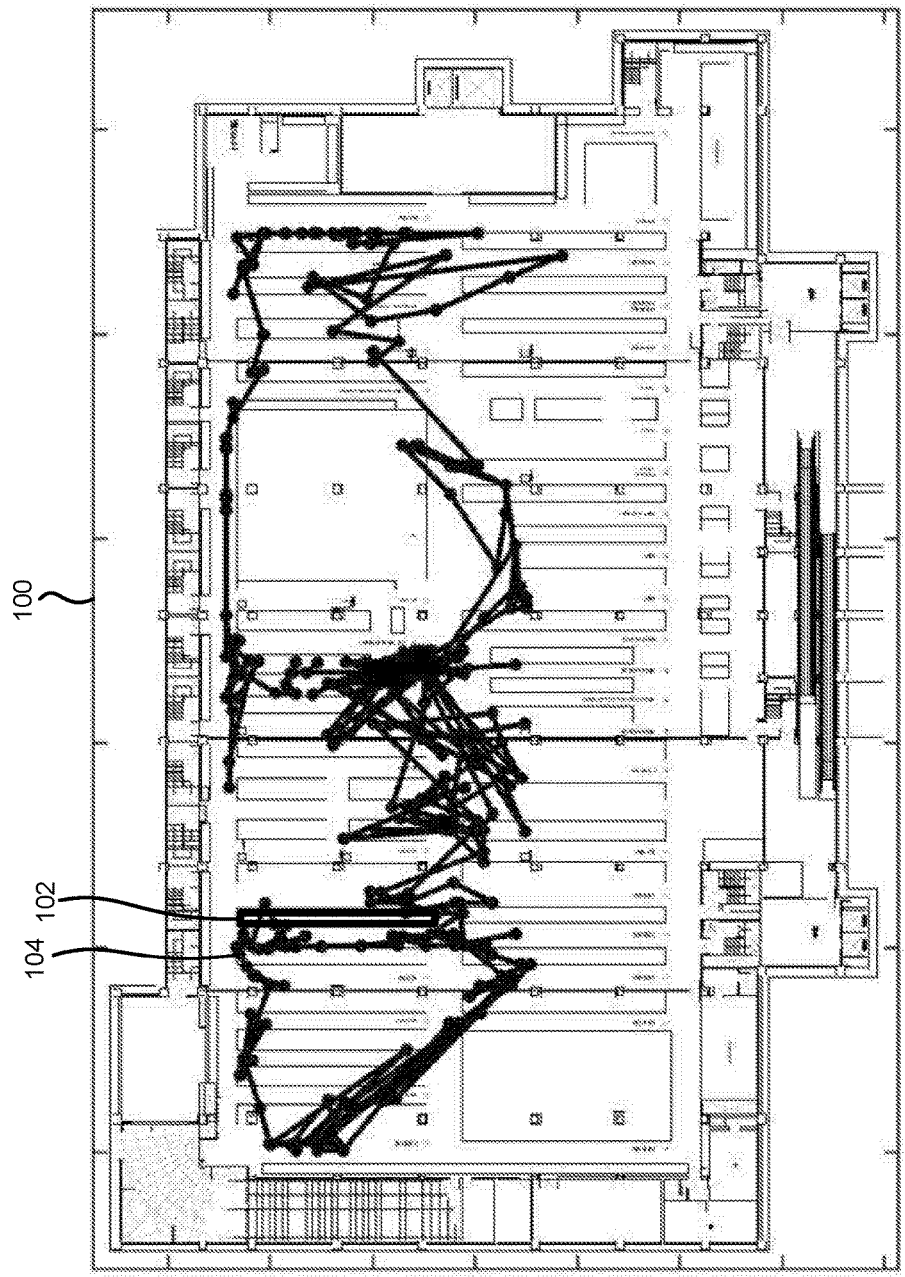
FIG. 1 illustrates a schematic of an indoor environment and a route constructed using raw location estimates.
Figure 2:
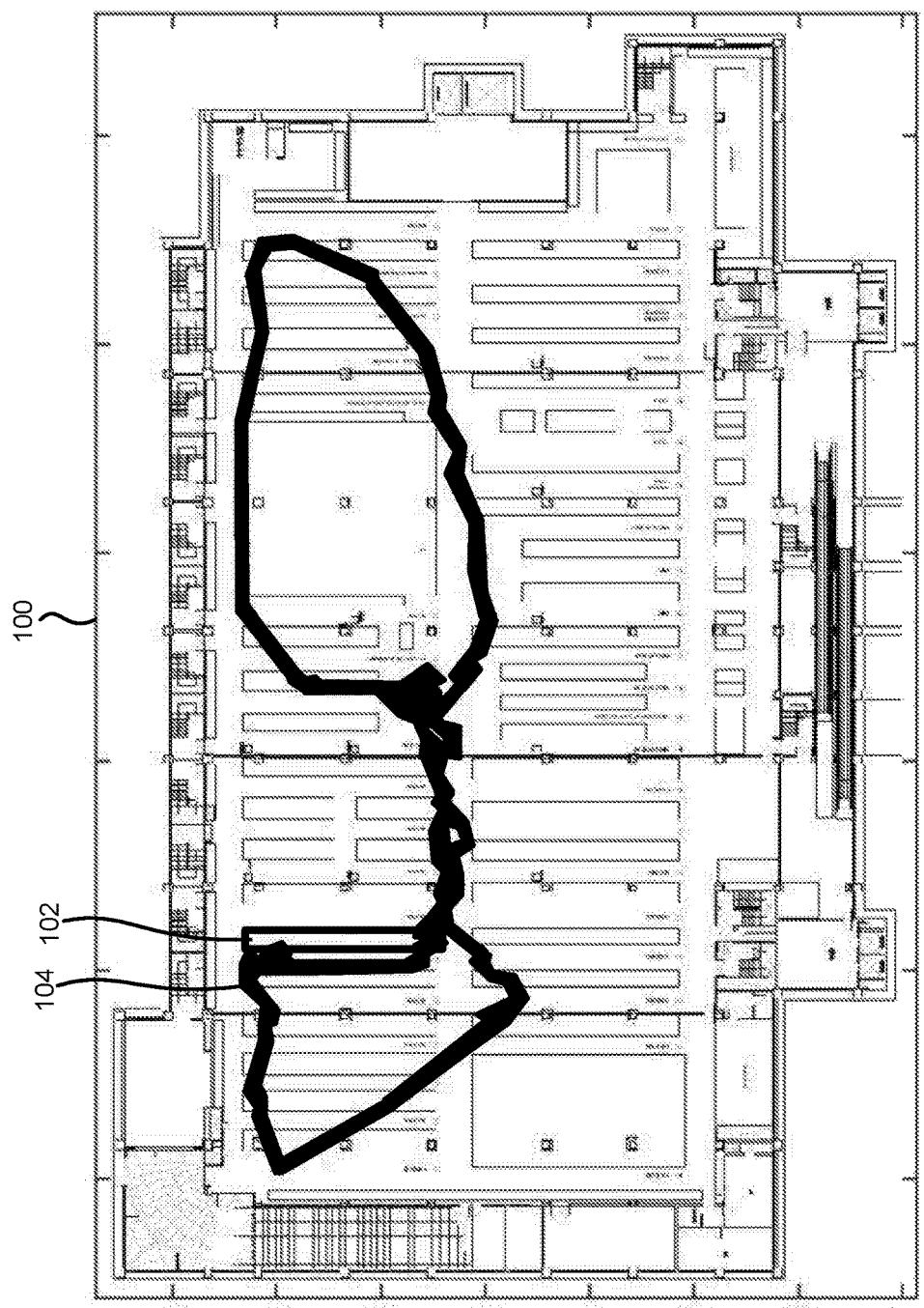
FIG. 2 illustrates another schematic of an indoor environment and a route constructed using raw location estimates passed through a variation of a low-pass filter.
Figure 14:
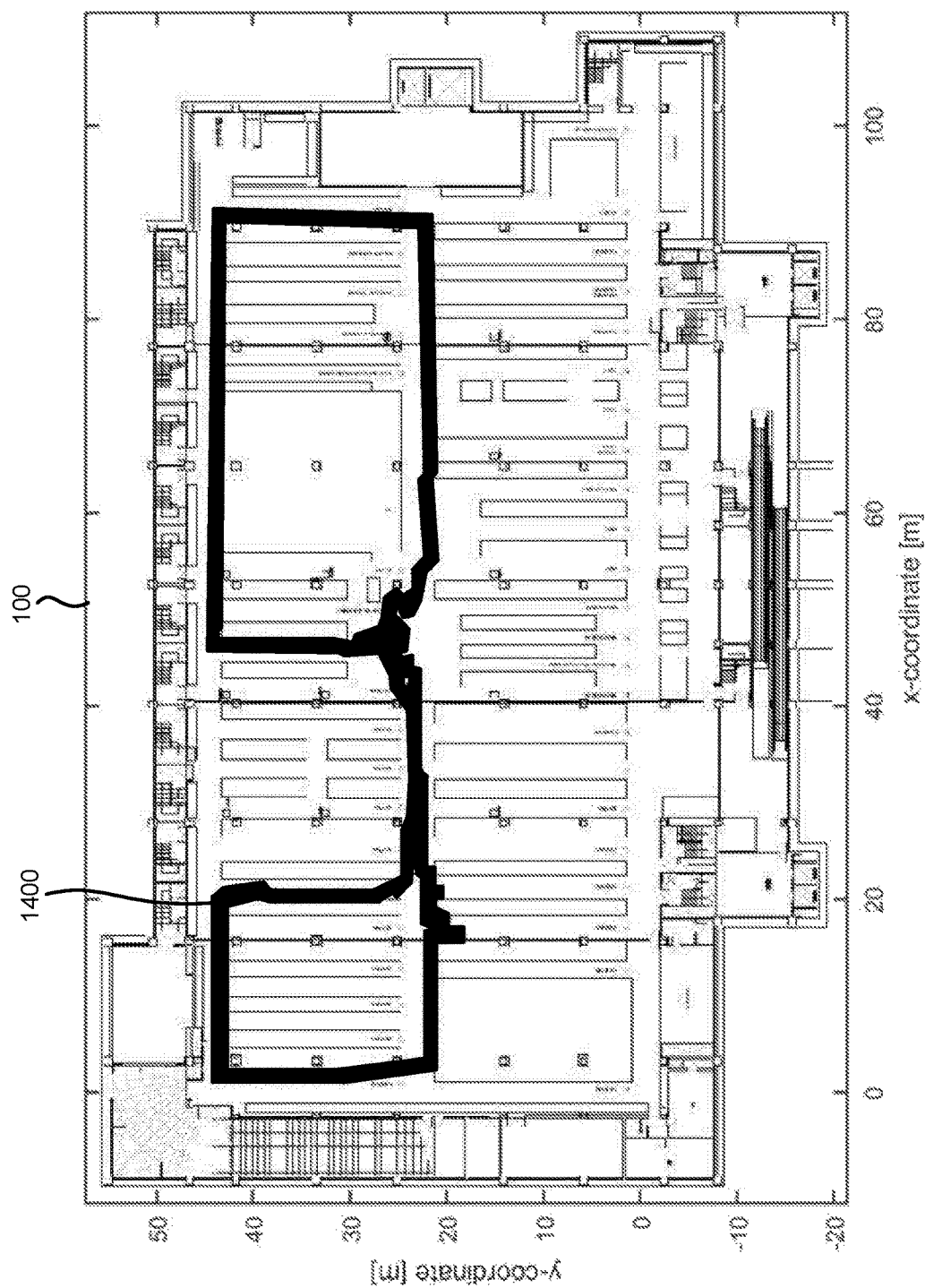
FIG. 14 illustrates a filtered route generated by the system using the methods described herein.

FIG. 14 illustrates a representation of a filtered route 1400 generated by the system 300 using the methods described herein. The filtered route 1400 can be constructed using current and all preceding instances of the new location 1314 of the device 310 calculated by the system 300. When comparing the filtered route 1400 of FIG. 14 with the estimated routes 104 depicted in FIGS. 1 and 2, it is apparent that the methods and systems described herein provide improvements in the field of indoor localization. Moreover, the methods and systems described herein provide improvements in the field of indoor localization when the indoor environment 100 contains polygonal obstructions 102 serving as physical barriers hindering or impeding the movement of a user, vehicle, or entity carrying the device 310 in the indoor environment 100.

In addition, the methods and algorithms described herein are robust, efficient, and provide a more accurate estimate of the location of a portable wireless device in an indoor environment 100 than traditional localization methods using wireless fingerprinting. Furthermore, the methods and systems described herein can be used with currently deployed wireless signal transceivers 302 and are cost-effective when compared to expensive and complicated beacon or device-proximity networks.

Figure 15:
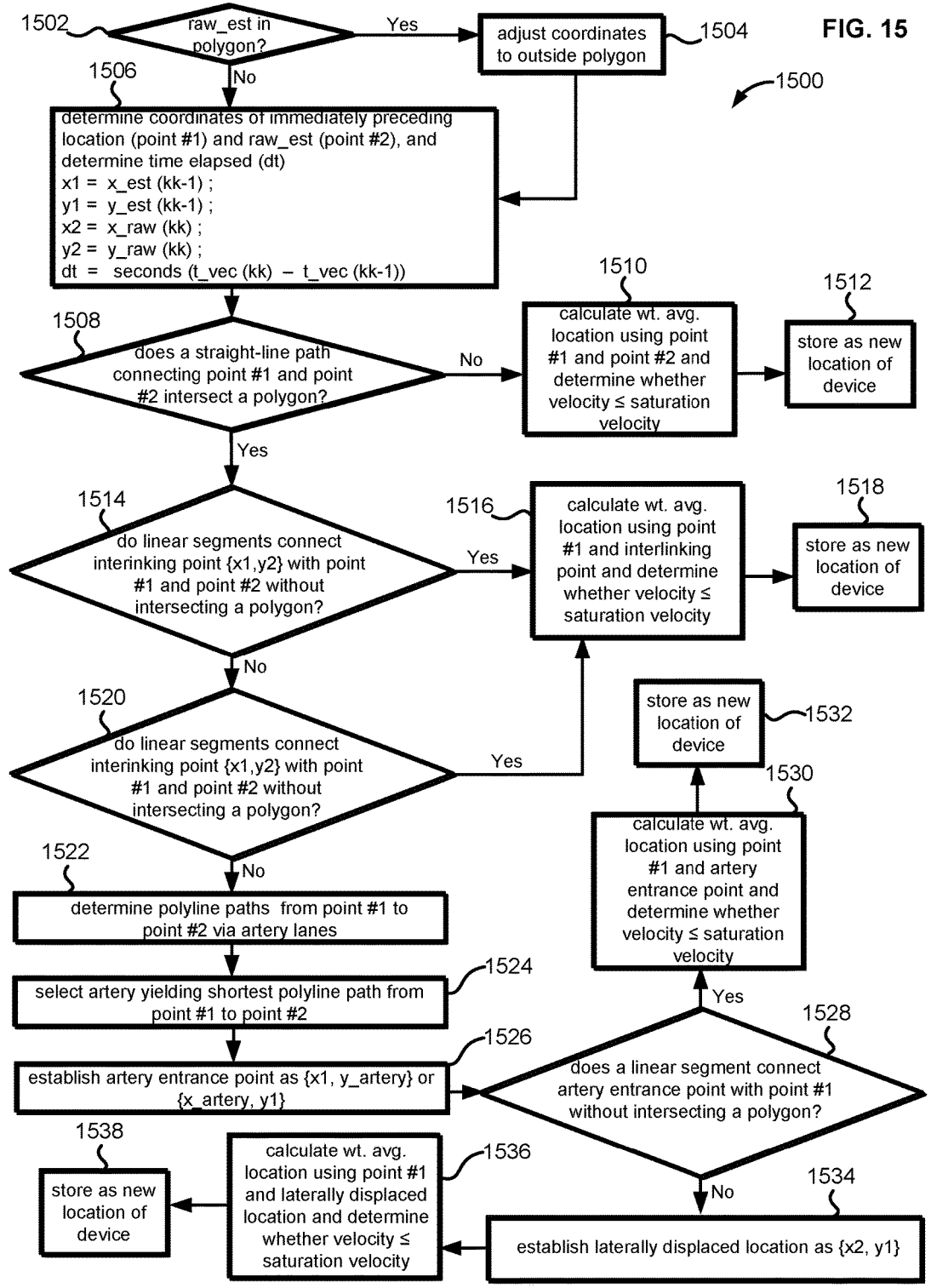
FIG. 15 is a flowchart representing a variation of a method undertaken by the system.

FIG. 15 is a flowchart representing a variation of a method 1500 undertaken by the system 300. The method 1500 can involve determining whether a raw estimated location 900 of the device 310 is within or on a border 504 of a polygonal obstruction 102 in the coordinate plane 500 in operation 1502. If the raw estimated location 900 is determined to be on or within a polygonal obstruction 102, the method 1500 can involve adjusting the coordinates 502 of the raw estimated location 900 to the nearest point outside of the polygonal obstruction 102 in operation 1504. If the raw estimated location 900 is not determined to be on or within a polygonal obstruction 102, the method 1500 can involve determining the coordinates 502 of an immediately preceding location 1002 and an elapsed time 1308 between receiving the signal strength profiles 800 of the immediately preceding location 1002 and the raw estimated location 900 in operation 1506.

The method 1500 can further involve determining whether a straight-line path 1000 connects the immediately preceding location 1002 and the raw estimated location 900 without intersecting any of the polygonal obstructions 102 in operation 1508. If the straight-line path 1000 connects the two locations without intersecting a polygonal obstruction 102, the method 1500 can proceed to calculating a weighted-average location 1300 using the raw-estimated location 900 as the candidate location 1004 in operation 1510. Operation 1510 can also involve comparing a hypothetical velocity 1302 calculated using the weighted-average location 1300 and the immediately preceding location 1002 with a saturation velocity 1304. The method 1500 can further involve storing the candidate location 1004 as the new location 1314 or storing a calculated saturated location 1306 as the new location 1314 in operation 1512.

If the straight-line path 1000 from operation 1508 intersects at least one polygonal obstruction 102, the method 1500 can involve generating an interlinking point 1100 using the x-axis coordinate 1102 of the immediately preceding location 1002 and the y-axis coordinate 1104 of the raw estimated location 900 in operation 1514 or the y-axis coordinate 1104 of the immediately preceding location 1002 and the x-axis coordinate 1102 of the raw estimated location 900 in operation 1520. Operation 1514 or operation 1520 can also involve selecting the interlinking point 1100 as the candidate location 1004 when a first linear segment 1106 connecting the immediately preceding location 1002 and the interlinking point 1100 does not intersect any of the polygonal obstructions 102 and a second linear segment 1108 connecting the raw estimated location 900 and the interlinking point 1100 does not intersect any of the polygonal obstructions 102. If the first linear segment 1106 and the second linear segment 1108 do not intersect any of the polygonal obstructions 102, the method 1500 can involve calculating the weighted-average location 1300 using the immediately preceding location 1002 and the interlinking point 1100 as the candidate location 1004 in operation 1510 or operation 1516. The method 1500 can further involve comparing a hypothetical velocity 1302 calculated using the weighted-average location 1300 and the immediately preceding location 1002 with a saturation velocity 1304 and storing the candidate location 1004 as the new location 1314 or storing a calculated saturated location 1306 as the new location 1314 in operation 1512 or operation 1518.

If the first linear segment 1106 and the second linear segment 1108 cannot connect the interlinking point 1100 with the immediately preceding location 1002 and the raw estimated location 900, respectively, without intersecting a polygonal obstruction 102, the method 1500 can involve determining polyline paths from the immediately preceding location 1002 to the raw estimated location 900 wherein a portion of the polyline paths traverses at least one artery lane in operation 1522. The method 1500 can further involve selecting the shortest polyline path where the shortest polyline path traverses at least a portion of an artery lane and selecting such an artery lane as the preferred artery lane 1212 in operation 1524. The method 1500 can further involve establishing an artery entrance location 1214 using the x-axis coordinate 1102 of the immediately preceding location 1002 and the y-axis coordinate 1104 of the preferred artery lane 1212 or using the y-axis coordinate 1104 of the immediately preceding location 1002 and the x-axis coordinate 1102 of the preferred artery lane 1212 in operation 1526.

The method 1500 can further involve selecting the artery entrance location 1214 as the candidate location 1004 when a straight-line segment 1216 can connect the immediately preceding location 1002 to the artery entrance location 1214 without intersecting a polygonal obstruction 102 in operation 1528. The method 1500 can involve calculating the weighted-average location 1300 using the immediately preceding location 1002 and the artery entrance location 1214 as the candidate location 1004 in operation 1530. The method 1500 can further involve comparing a hypothetical velocity 1302 calculated using the weighted-average location 1300 and the immediately preceding location 1002 with a saturation velocity 1304 and storing the candidate location 1004 as the new location 1314 or storing a calculated saturated location 1306 as the new location 1314 in operation 1532.

If the straight-line segment 1216 intersects a part of a polygonal obstruction 102, the method 1500 can involve determining a laterally displaced location 1218 using the y-axis coordinate 1104 of the immediately preceding location 1002 and the x-axis coordinate 1102 of the raw estimated location 900 in operation 1534. The method 1500 can further involve calculating the weighted-average location 1300 using the immediately preceding location 1002 and the laterally displaced location 1218 as the candidate location 1004 in operation 1536. The method 1500 can further involve comparing a hypothetical velocity 1302 calculated using the weighted-average location 1300 and the immediately preceding location 1002 with a saturation velocity 1304 and storing the candidate location 1004 as the new location 1314 or storing a calculated saturated location 1306 as the new location 1314 in operation 1538.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or processing unit of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

I claim:

1. A system to localize a device in an indoor environment, the system comprising:
   wireless signal transceivers positioned in the indoor environment, wherein the indoor environment contains one or more polygonal obstructions;
   a server comprising a processing unit, a memory unit, and a server communication unit, and the processing unit is programmed to:
   receive a signal strength profile, wherein the signal strength profile includes at least one of signal strengths of the wireless signal transceivers received at the device in the indoor environment and signal strengths of the device received at the wireless signal transceivers in the indoor environment;
   determine a raw estimated location of the device in a coordinate plane representing the indoor environment by using a K-nearest neighbor (KNN) algorithm to compare the signal strength profile with reference profiles stored in a database;
   calculate a straight-line path in the coordinate plane connecting the raw estimated location to an immediately preceding location of the device;
   select the raw estimated location as the candidate location if the straight-line path does not intersect any of the polygonal obstructions in the coordinate plane using a polyxpoly( ) function as follows:
   if isempty(polyxpoly[(x_old x_raw], [y_old y_raw], keepouts_x, keepouts_y))
   [x_est, yet]=LPF(dt, x_old, y_old, e_raw, y_raw, p_gain, v_lim), wherein x_old and y_old represent the immediately preceding location, wherein x_raw and y_raw represent the raw estimated location, and wherein x_est and y_est represent the candidate location;

calculate a weighted-average location using the immediately preceding location and the candidate location; and store the weighted-average location as a new location of the device in the indoor environment when a hypothetical velocity calculated using an elapsed time and a distance separating the immediately preceding location and the weighted-average location is less than or equal to a saturation velocity.

2. The system of claim 1, wherein the processing unit is further programmed to:

generate an interlinking point using an x-axis coordinate of the immediately preceding location and a y-axis coordinate of the raw estimated location or the y-axis coordinate of the immediately preceding location and the x-axis coordinate of the raw estimated location; and select the interlinking point as the candidate location when:

a first linear segment connects the immediately preceding location and the interlinking point without intersecting any of the polygonal obstructions, and a second linear segment connects the raw estimated location and the interlinking point without intersecting any of the polygonal obstructions.

3. The system of claim 2, wherein the processing unit is further programmed to:

determine a first polyline path from the immediately preceding location to the raw estimated location, wherein a portion of the first polyline path traverses a first artery lane in the indoor environment;

determine a second polyline path from the immediately preceding location to the raw estimated location, wherein a portion of the second polyline path traverses a second artery lane in the indoor environment; and select the first artery lane as a preferred artery lane when the first polyline path is shorter than the second polyline path;

select the second artery lane as the preferred artery lane when the second polyline path is shorter than the first polyline path;

generate an artery entrance location using an x-axis coordinate of the immediately preceding location and a y-axis coordinate of the preferred artery lane or using the y-axis coordinate of the immediately preceding location and the x-axis coordinate of the preferred artery lane; and select the artery entrance location as the candidate location.

4. The system of claim 3, wherein the processing unit is further programmed to:

calculate a straight-line segment from the immediately preceding location to the artery entrance location prior to selecting the artery entrance location as the candidate location;

determine a laterally displaced location when the straight-line segment intersects any of the polygonal obstructions, wherein the laterally displaced location is determined using a y-axis coordinate of the immediately preceding location and an x-axis coordinate of the raw estimated location; and select the laterally displaced location as the candidate location.

5. The system of claim 1, wherein the processing unit is further programmed to:

compare the raw estimated location of the device in the coordinate plane with coordinates representing borders of the polygonal obstructions prior to calculating the straight-line path;

determine the raw estimated location is within the borders of one of the polygonal obstructions;

adjust at least one coordinate of the raw estimated location to place the raw estimated location outside of the borders of the polygonal obstruction.

6. The system of claim 1, wherein the processing unit is further programmed to:

set a saturated location as the new location of the device when the hypothetical velocity calculated using the elapsed time and the distance separating the immediately preceding location and the weighted-average location is greater than the saturation velocity, wherein the saturated location is generated using the saturation velocity, and wherein the saturated location is closer in distance to the immediately preceding location than the weighted-average location.

7. The system of claim 1, wherein the indoor environment comprises between one wireless signal transceiver per 150 square meters and one wireless signal transceiver per 57 square meters.

8. The system of claim 1, wherein the wireless signal transceivers include at least one of WiFi access points and Bluetooth® beacons.

9. A computer-implemented method to localize a device in an indoor environment, the method comprising:

receiving, at a server, a signal strength profile, wherein the signal strength profile includes at least one of signal strengths of wireless signal transceivers received at the device in the indoor environment and signal strengths of the device received at wireless signal transceivers in the indoor environment, and wherein the indoor environment contains one or more polygonal obstructions;

determining, using a processing unit of the server, a raw estimated location of the device in a coordinate plane representing the indoor environment by using a K-nearest neighbor (KNN) algorithm to compare the signal strength profile with reference profiles stored in a database;

calculating, using the processing unit of the server, a straight-line path in the coordinate plane from an immediately preceding location of the device to the raw estimated location;

selecting, using the processing unit of the server, the raw estimated location as a candidate location when the straight-line path connects the two locations without intersecting any of the polygonal obstructions in the coordinate plane using a polyxpoly( ) function as follows:

if isempty(polyxpoly[(x_old x_raw], [y_old y_raw], keepouts_x, keepouts_y))

[x_est, yet]=LPF(dt, x_old, y_old, e_raw, y_raw, p_gain, v_lim), wherein x_old and y_old represent the immediately preceding location, wherein x_raw and y_raw represent the raw estimated location, and wherein x_est and y_est represent the candidate location;

calculating, using the processing unit of the server, a weighted-average location using the immediately preceding location and the candidate location; and storing, using the processing unit of the server, the weighted-average location as a new location of the device in the indoor environment when a hypothetical velocity calculated using an elapsed time and a distance separating the immediately preceding location and the weighted-average location is less than or equal to a saturation velocity.

10. The computer-implemented method of claim 9, further comprising:

generating, using the processing unit of the server, an interlinking point using an x-axis coordinate of the immediately preceding location and a y-axis coordinate of the raw estimated location or the y-axis coordinate of the immediately preceding location and the x-axis coordinate of the raw estimated location; and selecting, using the processing unit of the server, the interlinking point as the candidate location when:
a first linear segment connects the immediately preceding location and the interlinking point without intersecting any of the polygonal obstructions, and
a second linear segment connects the raw estimated location and the interlinking point without intersecting any of the polygonal obstructions.

11. The computer-implemented method of claim 10, further comprising:

determining, using the processing unit of the server, a first polyline path from the immediately preceding location to the raw estimated location, wherein a portion of the first polyline path traverses a first artery lane in the indoor environment;

determining, using the processing unit of the server, a second polyline path from the immediately preceding location to the raw estimated location, wherein a portion of the second polyline path traverses a second artery lane in the indoor environment; and selecting, using the processing unit of the server, the first artery lane as a preferred artery lane when the first polyline path is shorter than the second polyline path;

selecting, using the processing unit of the server, the second artery lane as the preferred artery lane when the second polyline path is shorter than the first polyline path;

generating, using the processing unit of the server, an artery entrance location using an x-axis coordinate of the immediately preceding location and a y-axis coordinate of the preferred artery lane or using the y-axis coordinate of the immediately preceding location and the x-axis coordinate of the preferred artery lane; and selecting, using the processing unit of the server, the artery entrance location as the candidate location.

12. The computer-implemented method of claim 11, further comprising:

calculating, using the processing unit of the server, a straight-line segment from the immediately preceding location to the artery entrance location prior to selecting the artery entrance location as the candidate location;

determining, using the processing unit of the server, a laterally displaced location when the straight-line segment intersects any of the polygonal obstructions, wherein the laterally displaced location is determined using a y-axis coordinate of the immediately preceding location and an x-axis coordinate of the raw estimated location; and selecting, using the processing unit of the server, the laterally displaced location as the candidate location.

13. The computer-implemented method of claim 9, further comprising:

comparing, using the processing unit of the server, the raw estimated location of the device in the coordinate plane with coordinates representing borders of the polygonal obstructions prior to calculating the straight-line path;

determining, using the processing unit of the server, the raw estimated location is within the borders of one of the polygonal obstructions;

adjusting, using the processing unit of the server, at least one coordinate of the raw estimated location to place the raw estimated location outside of the borders of the polygonal obstruction.

14. The computer-implemented method of claim 9, further comprising:

setting, using the processing unit of the server, a saturated location as the new location of the device when the hypothetical velocity calculated using the elapsed time and the distance separating the immediately preceding location and the weighted-average location is greater than the saturation velocity,
wherein the saturated location is generated using the saturation velocity, and
wherein the saturated location is closer in distance to the immediately preceding location than the weighted-average location.

15. A non-transitory computer-readable medium comprising instructions stored thereon, that when executed by a processing unit, perform the steps of:

receiving a signal strength profile, wherein the signal strength profile includes at least one of signal strengths of wireless signal transceivers received at a device in the indoor environment and signal strengths of a device received at wireless signal transceivers in the indoor environment and wherein the indoor environment contains one or more polygonal obstructions;

determining a raw estimated location of the device in a coordinate plane representing the indoor environment by using a K-nearest neighbor (KNN) algorithm to compare the signal strength profile with reference profiles stored in a database;

calculating a straight-line path in the coordinate plane connecting the raw estimated location to an immediately preceding location of the device;

selecting the raw estimated location as the candidate location if the straight-line path does not intersect any of the polygonal obstructions in the coordinate plane using a polyxpoly( ) function as follows:
if isempty(polyxpoly[(x_old x_raw], [y_old y_raw], keepouts_x, keepouts_y))
[x_est, yet]=LPF(dt, x_old, y_old, e_raw, y_raw, p_gain, v_lim),
wherein x_old and y_old represent the immediately preceding location,
wherein x_raw and y_raw represent the raw estimated location, and
wherein x_est and y_est represent the candidate location;

calculating a weighted-average location using the immediately preceding location and the candidate location; and storing the weighted-average location as a new location of the device in the indoor environment when a hypothetical velocity calculated using an elapsed time and a distance separating the immediately preceding location and the weighted-average location is less than or equal to a saturation velocity.

16. The non-transitory computer-readable medium of claim 15, further comprising instructions stored thereon, that when executed by a processing unit, perform the steps of:
generating an interlinking point using an x-axis coordinate of the immediately preceding location and a y-axis coordinate of the raw estimated location or the y-axis coordinate of the immediately preceding location and the x-axis coordinate of the raw estimated location; and
selecting the interlinking point as the candidate location when:
a first linear segment connects the immediately preceding location and the interlinking point without intersecting any of the polygonal obstructions, and
a second linear segment connects the raw estimated location and the interlinking point without intersecting any of the polygonal obstructions.

17. The non-transitory computer-readable medium of claim 16, further comprising instructions stored thereon, that when executed by a processing unit, perform the steps of:
determining a first polyline path from the immediately preceding location to the raw estimated location, wherein a portion of the first polyline path traverses a first artery lane in the indoor environment;
determining a second polyline path from the immediately preceding location to the raw estimated location, wherein a portion of the second polyline path traverses a second artery lane in the indoor environment; and
selecting the first artery lane as a preferred artery lane when the first polyline path is shorter than the second polyline path;
selecting the second artery lane as the preferred artery lane when the second polyline path is shorter than the first polyline path;
generating an artery entrance location using an x-axis coordinate of the immediately preceding location and a y-axis coordinate of the preferred artery lane or using the y-axis coordinate of the immediately preceding location and the x-axis coordinate of the preferred artery lane; and
selecting the artery entrance location as the candidate location.

18. The non-transitory computer-readable medium of claim 17, further comprising instructions stored thereon, that when executed by a processing unit, perform the steps of:
calculating, using the processing unit of the server, a straight-line segment from the immediately preceding location to the artery entrance location prior to selecting the artery entrance location as the candidate location;
determining, using the processing unit of the server, a laterally displaced location when the straight-line segment intersects any of the polygonal obstructions, wherein the laterally displaced location is determined using a y-axis coordinate of the immediately preceding location and an x-axis coordinate of the raw estimated location; and
selecting, using the processing unit of the server, the laterally displaced location as the candidate location.

19. The non-transitory computer-readable medium of claim 15, further comprising instructions stored thereon, that when executed by a processing unit, perform the steps of:
comparing the raw estimated location of the device in the coordinate plane with coordinates representing borders of the polygonal obstructions prior to calculating the straight-line path;
determining the raw estimated location is within the borders of one of the polygonal obstructions;
adjusting at least one coordinate of the raw estimated location to place the raw estimated location outside of the borders of the polygonal obstruction.

20. The non-transitory computer-readable medium of claim 15, further comprising instructions stored thereon, that when executed by a processing unit, perform the steps of:
setting a saturated location as the new location of the device when the hypothetical velocity calculated using the elapsed time and the distance separating the immediately preceding location and the weighted-average location is greater than the saturation velocity,
wherein the saturated location is generated using the saturation velocity, and
wherein the saturated location is closer in distance to the immediately preceding location than the weighted-average location.

* * * * *